US008062623B2

(12) United States Patent
Daly et al.

(10) Patent No.: US 8,062,623 B2
(45) Date of Patent: Nov. 22, 2011

(54) STABLE, CATALYZED, HIGH TEMPERATURE COMBUSTION IN MICROCHANNEL, INTEGRATED COMBUSTION REACTORS

(75) Inventors: Francis P. Daly, Delaware, OH (US); Junko M. Watson, Columbus, OH (US); Yong Wang, Richland, WA (US); Jianli Hu, Kennewick, WA (US); Chunshe Cao, Kennewick, WA (US); Richard Long, New Albany, OH (US)

(73) Assignee: Velocys, Plain City, OH (US)

( * ) Notice: Subject to any disclaimer, the term of this patent is extended or adjusted under 35 U.S.C. 154(b) by 900 days.

(21) Appl. No.: 10/966,162

(22) Filed: Oct. 15, 2004

(65) Prior Publication Data

US 2006/0083675 A1 Apr. 20, 2006

(51) Int. Cl.
*C01B 3/26* (2006.01)

(52) U.S. Cl. .................................................... 423/651

(58) Field of Classification Search .................. 423/651
See application file for complete search history.

(56) References Cited

U.S. PATENT DOCUMENTS 3,705,095 A * 12/1972 Dalson et al. .................. 208/65
3,846,383 A 11/1974 Erickson et al.
4,116,883 A 9/1978 Rhodes et al.
4,171,287 A 10/1979 Keith
4,251,391 A * 2/1981 Mauldin et al. ............... 502/223
4,492,769 A 1/1985 Blanchard et al.
4,738,946 A 4/1988 Yamashita et al.
5,100,702 A 3/1992 Maeda et al.
5,110,780 A 5/1992 Peters
5,183,401 A 2/1993 Dalla Betta et al.
5,232,357 A 8/1993 Dalla Betta et al.
5,250,489 A 10/1993 Dalla Betta et al.
5,258,349 A 11/1993 Dalla Betta et al.
5,259,754 A 11/1993 Dalla Betta et al.
5,281,128 A 1/1994 Dalla Betta et al.
5,308,547 A 5/1994 Dalla Betta et al.
5,425,632 A 6/1995 Tsurumi et al.
5,474,441 A 12/1995 Farrauto et al.
5,500,315 A 3/1996 Calvert et al.
5,518,697 A 5/1996 Dalla Betta et al.
5,916,505 A * 6/1999 Cisar et al. ..................... 264/85
5,948,377 A 9/1999 Sung
6,015,285 A 1/2000 McCarty et al.

(Continued)

FOREIGN PATENT DOCUMENTS

EP 1195196 4/2002

(Continued)

OTHER PUBLICATIONS

Venkataraman et al., "Steam Reforming of Methane and Water-Gas Shift in Catalytic Wall Reactors" May 2003 AIChE Journal, vol. 49, No. 5, p. 1277.*

(Continued)

*Primary Examiner* — Jessica L Ward
*Assistant Examiner* — Nicholas D'Aniello
(74) *Attorney, Agent, or Firm* — Frank Rosenberg

(57) ABSTRACT

Catalysts containing 30 weight percent or more platinum have surprisingly been discovered to possess superior stability and activity for catalyzing combustion reactions. The addition of rhenium improves catalyst performance in fuel lean conditions but has undesirable effects in fuel rich conditions. The invention provides integrated combustion microreactors, chemical systems utilizing these integrated combustion microreactors, methods of combustion, and methods of providing heat to endothermic reactions in integrated combustion microreactors.

25 Claims, 37 Drawing Sheets

Fluid B Inlet
Fluid B Outlet
Fluid B Inlet
Fluid A Inlet
Fluid C Inlet
Fluid AC Outlet
Fluid C Inlet
Fluid A Inlet
10
20
18
14
16
14
12
18

U.S. PATENT DOCUMENTS 6,117,578 A 9/2000 Lesieur
6,180,846 B1 1/2001 Dandekar et al.
6,200,536 B1 3/2001 Tonkovich et al.
6,207,128 B1 3/2001 Sellin et al.
6,277,339 B1 8/2001 Boneberg et al.
6,284,210 B1 9/2001 Euzen et al.
6,391,477 B1 5/2002 Koslov et al.
6,488,907 B1 12/2002 Barnes et al.
6,508,862 B1 1/2003 Tonkovich et al.
6,524,992 B2 2/2003 Mussmann et al.
6,528,452 B1 3/2003 Bergmann
6,595,003 B2 7/2003 Dalla Betta et al.
6,667,012 B1 12/2003 Anand et al.
6,709,640 B1 3/2004 Romantier et al.
7,181,906 B2 2/2007 Dalla Betta et al.
2002/0031471 A1 3/2002 Tonkovich et al.
2002/0099103 A1 7/2002 Tonkovich et al.
2003/0105172 A1* 6/2003 Bowe et al. .................. 518/728
2003/0152488 A1 8/2003 Tonkovich et al.
2003/0180215 A1 9/2003 Niu et al.
2003/0194363 A1 10/2003 Ramesh et al.
2004/0076562 A1 4/2004 Tonkovich et al.
2004/0175317 A1 9/2004 Yang et al.
2004/0220434 A1 11/2004 Brophy et al.
2004/0229752 A1 11/2004 Long et al.
2005/0133457 A1 6/2005 Tonkovich et al.
2005/0082519 A1 8/2005 Tonkovich et al.
2005/0176580 A1* 8/2005 Osaka et al. .................. 502/339
2005/0244304 A1 11/2005 Tonkovich et al.
2005/0271563 A1 12/2005 Yang et al.
2006/0083672 A1 4/2006 Daly et al.
2006/0129015 A1 6/2006 Tonkovich et al.
2006/0142401 A1 6/2006 Tonkovich et al.
2006/0143980 A1 7/2006 Rapier et al.
2006/0147370 A1 7/2006 Mathias et al.
2006/0275185 A1 12/2006 Tonkovich et al.

FOREIGN PATENT DOCUMENTS

WO WO99/53561 10/1999
WO WO99/64146 12/1999
WO WO 03/092888 * 11/2003
WO WO2004030805 4/2004
WO WO2005094982 10/2005

OTHER PUBLICATIONS

PCT International Search Report from PCT/US2005/037290, mailed Jul. 11, 2006.
Prestvik et al., “The Influence of Pretreatment on the Metal Function of a Commercial Pt—Re/Al2O3 Catalyst,” J. Catal. 119-129 (1998).
Chou et al., “Effects of the addition of lanthana on the thermal stability of alumina-supported palladium,” Catalysis Today, 53-58 (1995).
Final Office Action in U.S. Appl. No. 10/966,158, mailed Nov. 13, 2008.

* cited by examiner

Effect of Support

STABLE, CATALYZED, HIGH TEMPERATURE COMBUSTION IN MICROCHANNEL, INTEGRATED COMBUSTION REACTORS

FIELD OF THE INVENTION

The invention relates to integrated combustion microreactors, chemical systems utilizing these integrated combustion microreactors, and methods of providing heat to endothermic reactions in integrated combustion microreactors.

INTRODUCTION

In integrated combustion reactors (ICRs), heat from a combustion reaction that is conducted in one portion of a ICR is transferred to an endothermic reaction in another portion of the ICR. In many cases, the combustion is catalysed by a solid catalyst. For some endothermic reactions, such as methane steam reforming, the combustion reaction must occur at high temperature and, for most applications, it is desired that the combustion reaction be stable over a long time.

One approach to conducting catalyzed combustion reactions in plate reactors has been discussed by Lesieur in U.S. Pat. No. 6,117,578. In this approach, the reformer side is washcoated with alumina and lanthanum oxide or cerium oxide or calcium oxide. Up to about 25 wt % Ni is deposited on the stabilized alumina. In the burner section, the walls can be washcoated with alumina and lanthanum oxide or cerium oxide or calcium oxide; if a catalyst is present, it will normally be a noble metal such as Pt or Pd or a mixture of these. This reference does not present any results, nor does it analyze catalyst performance under various conditions that might be encountered in operation of an ICR.

There are numerous references that describe catalysts for partial or complete combustion. For example, Niu et al. in Publication No. US 2003/0180215 A1 describes a controlled pore structure for partial oxidation. Barnes et al. in U.S. Pat. No. 6,488,907 describes a partial oxidation reaction over a noble metal catalyst on an aluminum-containing oxide-dispersion-strengthened alloy and an oxide surface layer. The metal support has longitudinal channels permitting high space velocities with minimal pressure drop. Dalla Betta et al. in U.S. Pat. No. 5,259,754 describes a partial oxidation process over a Pd on zirconia catalyst, optionally with another noble metal. Preferred substrates are aluminum-containing steels that are oxidized to form alumina whiskers that are then treated with a zirconium oxide sol. Gaffney et al. in Publication No. U.S. 2002/0177628 A1 describe a partial oxidation process over a Ni—Rh monolith catalyst.

There have been some studies on Pt—Re/$Al_2O_3$ catalysts. Prestvik et al. in "The Influence of Pretreatment on the Metal Function of a Commercial Pt—Re/$Al_2O_3$ Catalyst," J. Catal. pp 119-129 (1998) describes catalyst pretreatment and methylcyclohexane dehydrogenation over a Pt—Re/$Al_2O_3$ catalyst.

Dalla Betta et al. in U.S. Pat. No. 5,281,128 and Kazunori et al. in U.S. Pat. No. 5,425,632 describe a 3-stage combustion catalyst system having a first stage with Pd/$ZrO_2$ on a ceramic honeycomb, a second stage with Pd/$ZrO_2$ on a Fe/Cr/Al foil, and a third stage with about 20% Pt on an alumina coating on a Fe/Cr/Al alloy foil.

Despite extensive efforts over many years, there remains a need for catalytic systems and combustion methods that have high performance and stability at high temperature in microchannel reactors.

SUMMARY OF THE INVENTION

In a first aspect, the invention provides a method of providing heat to an endothermic reaction in an integrated combustion reactor, comprising: passing a composition comprising a hydrocarbon fuel and oxygen into a microchannel reaction chamber; wherein the hydrocarbon fuel is at least partially oxidized in the combustion chamber and heat is generated; wherein a thermally conductive wall separates the microchannel reaction chamber from an endothermic reaction chamber; and wherein at least a portion of the heat generated passes through the thermally conductive wall to drive an endothermic reaction occurring in the endothermic reaction chamber. The microchannel reaction chamber includes a combustion catalyst that comprises an alumina support and a catalyst metal. The combustion catalyst comprises alumina and at least 30 weight percent Pt.

The invention further provides an integrated combustion microreactor, comprising: a combustion chamber comprising a microchannel comprising a combustion catalyst; an endothermic reaction chamber that is adjacent the combustion chamber, wherein the endothermic reaction chamber comprises an endothermic reaction catalyst; and a thermally conductive wall separating the combustion chamber and the endothermic reaction chamber. The combustion catalyst comprises a support and catalyst metal. The support comprises alumina and the catalyst metal comprises Pt. The catalyst comprises at least 30 weight percent Pt.

In another aspect, the invention provides an integrated combustion reactor (ICR) with a continuous combustion channel having at least two zones: a first zone comprising a catalyst that comprises Pt and essentially no Re; and a second zone comprising a catalyst that comprises Pt—Re.

Unless stated otherwise, "conversion percent" refers to absolute conversion percent throughout these descriptions. "Contact time" is defined as the total catalyst chamber volume (including the catalyst substrate volume and bulk flow path if present) divided by the total volumetric inlet flowrate of reactants at standard temperature and pressure (STP: 273K and 1.013 bar absolute). Catalyst chamber volume includes any volume between a catalyst coating (or other flow-by catalyst arrangement) and the opposite wall of a reaction channel.

As is conventional patent terminology, "comprising" means including and when this term is used the invention can, in some narrower preferred embodiments, be described as "consisting essentially of" or in the narrowest embodiments as "consisting of." Aspects of the invention described as "comprising a" are not intended to be limited to a single component, but may contain additional components. Compositions "consisting essentially of" a set of components allow other components that so not substantially affect the character of the invention, and, similarly, compositions that are "essentially" without a specified element do not contain amounts of the element as would substantially affect the desired properties.

In some aspects, the present invention is defined as catalysts or catalyst systems containing stabilized alumina and Pt that are characterized by surprisingly good stability and conversion or selectivity. It may be subsequently discovered that other supports or catalyst metals may perform equivalently if substituted for the stabilized alumina and/or Pt in these catalysts or catalyst systems; however, the inventors are not presently aware of any such equivalent materials.

The invention includes methods of combusting, reactors, and systems that use the catalysts described herein.

Various embodiments of the invention can provide numerous advantages such as one or more of the following: improved catalyst performance, high stability under high temperature conditions, high conversions at relatively short contact times, selectivity control, lower cost, and ease of manufacturing.

DESCRIPTION OF PREFERRED EMBODIMENTS

Figure 1:
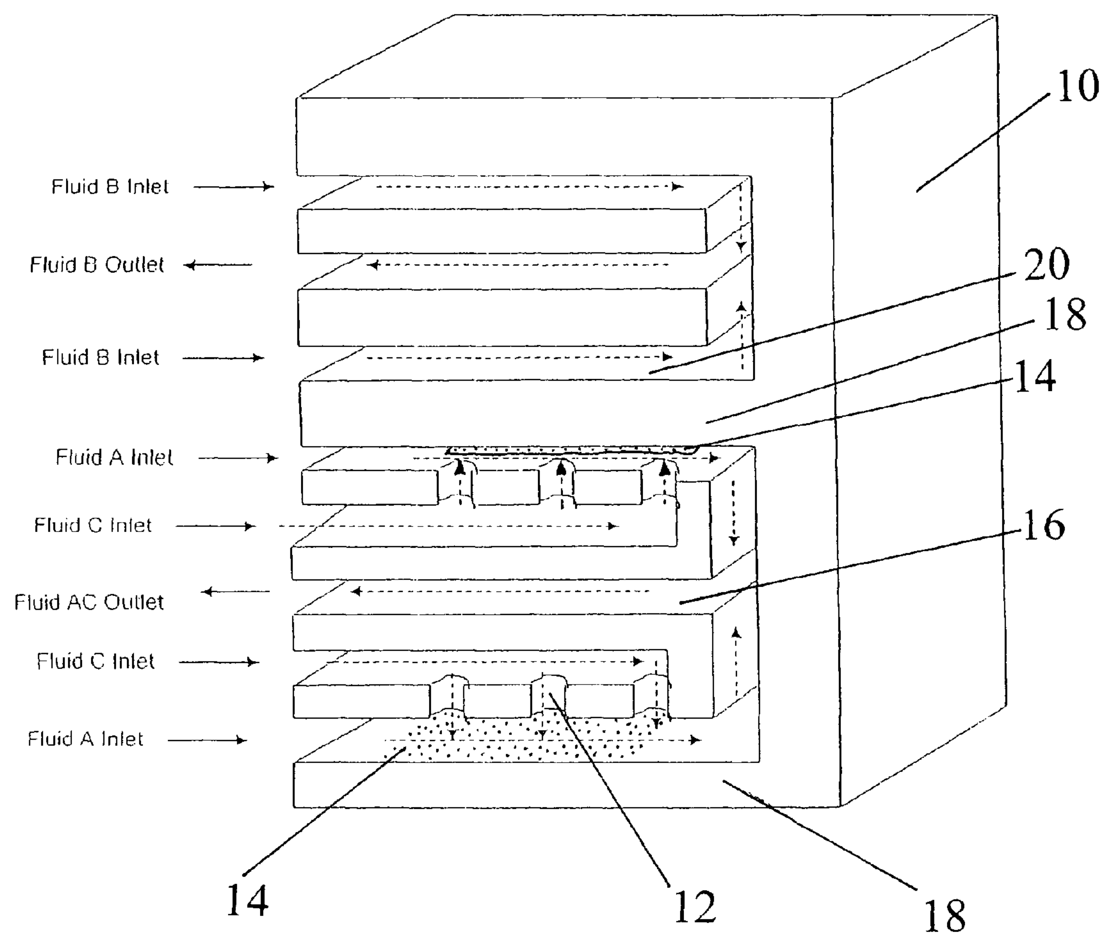
FIG. 1 schematically illustrates one design for an integrated combustion reactor.

The invention comprises a combustion catalyst that includes an alumina support for catalytically active material or materials. An "alumina support" contains aluminum atoms bonded to oxygen atoms, and additional elements can be present. Preferably, the alumina support comprises a stabilizing element or elements that improve the stability of the catalyst in conditions accompanying the high temperature combustion of hydrocarbons. Stabilizing elements typically are large, highly charged cations. In preferred embodiments, the alumina support is stabilized by La. In this invention, a "stabilized alumina support" is an alumina support containing at least one stabilizing element. Preferably, the stabilized alumina support contains 1 to 10, more preferably 3 to 7 weight percent of a stabilizing element or elements (preferably La).

The combustion catalyst contains Pt. The platinum content in a catalyst can be described either in terms of weight percent or in terms of mass per geometric surface area of substrate. Weight percent is based on the weight of platinum as a percent of catalyst powder, catalyst pellets, or washcoat; it does not include the weight of an underlying substrate and does not include the weight of interlayers between a washcoat (or washcoats) and an underlying substrate. For example, in the case of an alloy felt washcoated with alumina and Pt, the weight % would be $Pt/(Pt+Al_2O_3)\times100\%$. For a metal coupon that has been aluminized, then oxidized, then treated with solution of alumina and lanthanum and Pt, the weight of the oxidized aluminized layer would not be included in the calculation of weight % Pt. For superior results, the catalyst contains at least 30 wt % Pt, preferably at least 50 wt %, in some embodiments at least 70 wt %, and in some embodiments 30 to 90 wt %. In other preferred embodiments, the catalyst contains at least 3.0 $mg/in^2$ Pt, more preferably 4.5 $mg/in^2$ Pt (15 $mg/in^2$ of a 30 wt % Pt on alumina washcoat), in some preferred embodiments at least 6 $mg/in^2$ Pt, and in some embodiments 6 to 12 mg/in$^2$ Pt. For purposes of this measurement, the area refers to the geometrical area of the substrate; for a flat surface such as a foil or coupon, this area is quite simple, for a honeycomb or finned substrate or reaction channel, it would include all the surfaces that are coated by catalyst. The amount of Pt or the weight percent of Pt can be determined by known methods of chemical analysis.

In some embodiments, a stabilized alumina layer is coated over, and preferably in direct contact with, a high surface area material such as alumina, preferably (gamma)-alumina. This configuration provides high surface area for good metal dispersion and/or high metal loadings and also provides a stabilized alumina layer for excellent stability. The high surface area material is porous; the meaning of a stabilized alumina "disposed over" or "coated over" a high surface area material means that the stabilized alumina may also coat crevices and cavities within a high surface area material (such as gamma-alumina) or within a large pore substrate (such as a felt).

In some preferred embodiments, the catalyst comprises a metal, ceramic or composite substrate having a layer or layers of a catalyst material or materials deposited thereon. Preferably, the substrate is thermally conductive. A preferred substrate is a finned substrate that is characterized by the presence of fins (such as square-wave type fins) on the substrate's surface. These fins may, for example, take the form of fins etched in the wall of an integrated reactor or a finned insert (such as a flat metal plate with one grooved surface) that can be inserted into a combustion chamber of a microreactor. In some cases, the reactor can be refurbished by replacing an insert. One method of fabrication within a microchannel comprises the use of a slitting saw, partial etching using a photochemical process, or a laser EDM. This type of support provides numerous advantages including: high heat flux with short heat transfer distances, high surface area, and low pressure drop. Preferably, the support has a height (including fins) of less than 5 mm and preferably less than 2 mm and a fin-to-fin separation of 1000 μm or less, and in some embodiments, a fin-to-fin separation of 150 to 500 μm. Alternatively, the catalyst may take any conventional form such as a powder or pellet.

In some embodiments, the catalyst includes an underlying large pore substrate. Examples of preferred large pore substrates include commercially available metal foams and metal felts. Prior to depositing any coatings, a "large pore substrate" has a porosity of at least 5%, more preferably 30 to 99%, and still more preferably 70 to 98%. In some preferred embodiments, a large pore substrate has a volumetric average pore size, as measured by BET, of 0.1 μm or greater, more preferably between 1 and 500 μm. Preferred forms of porous substrates include foams and felts and these are preferably made of a thermally stable and conductive material, preferably a metal such as stainless steel or FeCrAlY alloy. These porous substrates can be thin, such as between 0.1 and 1 mm. Foams are continuous structures with continuous walls defining pores throughout the structure. Felts are nonwoven fibers with interstitial spaces between fibers and include tangled strands like steel wool. Felts are conventionally defined as being made of nonwoven fibers. In one embodiment, the large-pore substrate has a corrugated shape that could be placed in a reaction chamber (preferably a small channel) of a steam reformer. Various substrates and substrate configurations are described in U.S. Pat. No. 6,680,044 which is incorporated by reference.

A catalyst having a large pore support (and including the alumina-supported catalytically active sites) preferably has a pore volume of 5 to 98%, more preferably 30 to 95% of the total porous material's volume, with at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm).

In some embodiments, the catalyst, including the presence of catalytically active surface sites, as measured by BET, has a volumetric average pore size of less than 0.1 micrometer (μm). The catalyst, including the presence of catalytically active surface sites, as measured by BET, nitrogen physisorption, preferably has a surface area of more than 10 m$^2$/g, and in some embodiments a surface area of 20 to 500 m$^2$/g.

Some catalysts of this invention have a surface area, as measured by $N_2$ adsorption BET, of at least 5 m$^2$/g, more preferably at least 10 m$^2$/g, and in some embodiments 5 to about 50 m$^2$/g; and preferably maintain a surface area at or above these values after exposure to air at 1000° C. for 200 hours.

A catalyst support can be made from a composition that includes an alumina precursor. An "aluminum precursor" is any form of aluminum (such as an alumina slurry) that can be used to form solid alumina. The catalyst may be made starting from an alumina sol and/or solid alumina (including fumed alumina). Suitable, commercially available materials include colloidal alumina suspended in aqueous medium from Sasol, or Engelhard alumina ground to a particle size of 70-100 mesh. In some particularly preferred embodiments, the alumina precursor comprises fumed alumina particles. Fumed alumina is typically made by oxidizing aluminum chloride and is typically in the form of highly stable nanoparticles.

When an underlying substrate is used, an alumina slurry or sol can be coated over the substrate at any stage in the preparative process. For example, particles of a stabilized and heat-treated alumina can be slurry coated onto the substrate followed by depositing, drying and activating a metal via the impregnation method. Alternatively, a vapor coat or soluble form of alumina (or other high surface area material) could be applied onto a substrate prior to addition of a catalytic metal. In another embodiment, the substrate may be coated with a buffer layer formed in situ using chemical vapor deposition. The buffer layer may not have a high surface area, but may be used to create a layer with a CTE (coefficient of thermal expansion) between that of the base metal substrate and that of the higher surface area catalyst support to promote good adhesion of the layers. The buffer layer may also be used to inhibit corrosion of the base metal substrate by creating a near dense and almost pin-hole free coating. Although solution (such as spray coating) or slurry coating is typically less expensive, vapor coating of the various materials could also be employed. In some preferred embodiments, a buffer layer is formed by vapor depositing a layer of aluminum that is heat treated in air to form a layer of alumina. A hydrothermal or thermal pre-aging treatment of a buffer layer can be conducted either before or after applying an alumina washcoat to a substrate.

Platinum can be deposited onto alumina using known techniques such as the incipient wetness technique. In some preferred embodiments, a Pt precursor is added after a pre-aging treatment.

Hydrocarbons according to the present invention include: alkanes, alkenes, alkynes, alcohols, aromatics, and combinations thereof including fuels such as gasoline, kerosene, diesel, JP-8. For purposes of the present invention, "hydrocarbons" refers to fuels containing C—H bonds that combust to produce heat; although not desirable in a combustion fuel, less preferred embodiments of a "hydrocarbon" may include, for example, alcohols; since these can be combusted. Preferably, the hydrocarbon is an alkane or a fuel. Preferred alkanes are $C_1$-$C_{10}$ alkanes, such as methane, ethane, propane, butane, and isooctane. In some embodiments, fuel comprises methane, ethane, propane, butane, or combinations of these. The preferred oxidant is oxygen which, in some preferred embodiments, is in the form of air.

The present invention includes methods and systems in which a combustion catalyst is disposed within a microchannel reaction channel. The height and/or width of a reaction microchannel (wall-to-wall, not counting catalyst) is preferably 5 mm or less, and more preferably 2 mm or less, and in some embodiments 50 to 1000 μm. Both height and width are perpendicular to the direction of flow. The length of a reaction channel is parallel to flow through the channel and is typically longer than height and width. Preferably, the length of a reaction chamber is greater than 1 cm, more preferably in the range of 1 to 100 cm. Typically, the sides of the reaction channel are defined by reaction channel walls. These walls are preferably made of a hard material such as a ceramic, an iron based alloy such as steel, or a nickel-based alloy. In some preferred embodiments, the reaction chamber walls are comprised of stainless steel or inconel which is durable and has good thermal conductivity.

A combustion microchannel can be straight, curved or have a complex shape. Typically, the combustion channel will be adjacent to and conformal with an endothermic reaction channel. In some embodiments, fuel and oxidant enter together at the entrance of a channel; however, this configuration can lead to a hot spot wherever the conditions are sufficient for combustion, and may even lead to detonation. In preferred embodiments, the fuel or oxidant is added in a staged fashion along the length of channel; this allows careful control of temperature profile along the length of microchannel. The temperature may rise monotonically in a linear fashion or may rise more quickly near either the front or end of the catalyst bed. Thus, in some examples, the section of the catalyst-containing microchannel that exceeds 800° C. may only include the final 75%, or 50%, or 25%, or 10% of the catalyst bed, or any value therewithin. For the example of a temperature profile ranging from 650° C. to 850° C., the reaction may equilibrate near 840° C. and demonstrate an approach to equilibrium greater than 80% as defined by the peak temperature. The equivalent contact time spent in the reaction zone that exceeds 800° C. may be considerably less than the overall reaction contact time as defined by the entire reaction channel volume (i.e., the volume of the channel containing catalyst). As an example, the contact time within the entire reaction channel volume may be 5 ms, but only 1 ms in the reactor section at temperatures in the range of 800 to 850° C. In some embodiments, the temperature of the catalyst-containing microchannel may be highest near the end of the reaction zone, or, alternatively, may be higher near the front or middle of the reactor rather than near the end of the reaction zone.

One reactor design for an integrated combustion reactor 10 is schematically illustrated in FIG. 1. In one mode of operation, a fuel (i.e., hydrocarbon) flows into the two Fluid A inlets while oxygen flows into the Fluid C Inlet. The oxygen then passes through orifices 12 where it combines with the hydrocarbon. A combustion catalyst 14 can be disposed in the channel where oxygen and hydrocarbon combine. In the illustrated embodiment, the combusted gases flow out of the device through exhaust channel 16. Heat from the combustion passes through wall 18 to endothermic reaction channel 20. Of course, integrated combustion reactors can take many other configurations; for example, with reference to FIG. 1, a mixture of hydrocarbon and oxygen could be passed into Fluid B inlet where they combust to provide heat for an endothermic reaction in the channel connected to the Fluid A inlet.

In addition to the combustion channel(s), additional features such as microchannel or non-microchannel endothermic reaction channels may be present. Microchannel reaction channels are preferred. Having combustion microchannels adjacent endothermic reaction channels enable temperature in the reaction channels to be controlled precisely to promote steam reforming, or other endothermic reaction, and minimize unselective reactions in the gas phase. The thickness of a wall between adjacent process channels and combustion channels is preferably 5 mm or less. Each of the process or combustion channels may be further subdivided with parallel subchannels. The flow through adjacent endothermic reaction and combustion channels may be cross flow, counter-flow or co-flow. As described in greater detail in some of the incorporated patents, in some preferred embodiments combustion channels may be formed of a fuel subchannel and a oxidant subchannel that are connected to allow the controlled mixing of fuel and oxidant (sometimes called staged addition). For example, a hydrocarbon fuel can be added at one end of a fuel subchannel and oxygen is added from an adjacent oxygen subchannel through holes along the length (typically only part of the total length) of the fuel subchannel. In some preferred embodiments, the combustion channels have a u-shape in which fuel enters one end of the "u," is combusted, and exhaust exits from the other side of the "u." In a particularly preferred embodiment, a hydrocarbon fuel such as methane further comprises hydrogen and CO (such as might be come from a part of the product stream of a steam reforming reaction that is powered by the combustion reaction) and this mixture is combusted with oxygen in a first zone of a combustion channel. The hydrogen combusts quickly and a second zone of the combustion channel contains a fuel-rich mixture of hydrocarbon, CO and oxygen. A third zone (the afterburner or exhaust zone) contains a fuel-lean mixture of hydrocarbon, CO and oxygen.

The reactors preferably include a plurality of microchannel reaction channels and/or a plurality of adjacent combustion microchannels. A plurality of combustion microchannels may contain, for example, 2, 10, 100, 1000 or more channels. In some preferred embodiments, multiple combustion layers are interleaved with multiple reaction microchannels (for example, at least 10 combustion layers interleaved with at least 10 layers of reaction microchannels). For example, 3 alternating, interleaved layers would comprise layers in the order combustion: reaction: combustion: reaction: combustion: reaction. Typically, flow into and/or out of some or all of a plurality of combustion and/or endothermic reaction channels passes through a manifold or manifolds that combines or distributes the fluid flow. In preferred embodiments, microchannels are arranged in parallel arrays of planar microchannels; preferably a layer comprising a parallel array of planar microchannels is adjacent with another layer comprising a parallel array of planar microchannels where the adjacent layers exchange heat.

Preferred reactors usable in the present invention include those of the microcomponent sheet architecture variety (for example, a laminate with microchannels). Examples of integrated combustion reactors that could be used in the present invention are described in U.S. patent application Ser. No. 10/222,196, filed Aug. 15, 2002, which is incorporated herein by reference. Some other suitable reactor designs and methods of making reactors are disclosed in U.S. patent application Ser. No. 10/306,722, filed Nov. 27, 2002, and Ser. No. 10/408,744, filed Apr. 7, 2003, which are also incorporated herein, in full, by reference.

The reactors, catalysts and chemical systems of the present invention can also be described in terms of the data presented in the examples section. For example, a preferred reactor of the invention, can be characterized by testing under the conditions of run plan 2 (see Examples section) to obtain a given level of conversion or selectivity. Thus, the inventive reactors, catalysts and chemical systems can be characterized by a selected level of conversion or selectivity when tested under the conditions of any of run plans 1-10. These layers may also be described as "about" or "at least about" or "no more than about" the values shown in the Examples; it should be understood that these values are characteristic of various embodiments of the invention that can be obtained through routine experimentation in view of the descriptions herein.

The catalyst can fill up a cross-section of a combustion and/or endothermic reaction channel (a flow-through catalyst) or only occupy a portion of the cross-section of a reaction channel (flow-by). The use of a flow-by catalyst configuration can create an advantageous capacity/pressure drop relationship. In a flow-by catalyst configuration, gas preferably flows in a 0.1-2.0 mm gap adjacent to a catalyst insert or a thin layer of catalyst that contacts a microchannel wall (preferably the microchannel wall that contacts the catalyst is in direct thermal contact with a endothermic reaction channel, preferably an endothermic reaction process stream contacts the opposite side of the wall that contacts the catalyst). The term "bulk flow path" refers to an open path (contiguous bulk flow region) within the reaction chamber. A contiguous bulk flow region allows rapid gas flow through the reaction chamber without large pressure drops. In preferred embodiments there is laminar flow in the bulk flow region. Bulk flow regions within each reaction channel preferably have a cross-sectional area of $5\times10^{-8}$ to $1\times10^{-2}$ $m^2$, more preferably $5\times10^{-7}$ to $1\times10^{-4}$ $m^2$. The bulk flow regions preferably comprise at least 5%, more preferably 30-80% of either 1) the internal volume of the reaction chamber, or 2) the cross-section of the reaction channel. One example of a bulk flow path is the space between fins in a finned catalyst. The endothermic reaction channel(s) also preferably contains a bulk flow path having the properties discussed above.

The present invention also provides methods of combustion in which a hydrocarbon is reacted with oxygen at short residence times (or alternatively, described in contact times) over the catalysts described herein. The residence time is preferably less than 0.1 s. In some embodiments, short contact times are preferably 5-100 milliseconds (msec), in some embodiments, 10-25 msec.

Combustion reactions are preferably carried out at more than 650° C., more preferably more than 750° C., and in some embodiments in the range of 675 to 900° C. The reaction can be run over a broad pressure range from sub-ambient to very high, in some embodiments the process is conducted at a pressure of from 1 atm to 10 atm, more preferably 1 atm to 2 atm. In some preferred embodiments, where oxidant (typically oxygen that may be pure, or in the form of air, or in another mixture) is added along the length of a combustion channel, the combustion reaction conditions can be described as having three zones: an initial, fuel-rich zone (that may also contain $H_2$ and CO) called the $H_2$/CO zone; a middle partial oxidation (or POx) zone, and a fuel lean zone called the afterburner zone. Typically, these three zones are not distinct, but one zone gradually changes into the next. Fuel compositions in these zones are described at the start of a zone.

Certain aspects of the invention can best be described in terms of properties such as stability, conversion or selectivity. Both the catalysts and methods can be characterized in terms of hydrocarbon conversions and selectivities in combustion processes. Hydrocarbon conversion is preferably at least 50%, more preferably at least 80% and still more preferably at least 90%. The foregoing conversion values can be either absolute or equilibrium conversions. If not specified, conversion refers to absolute conversion. Under conditions where conversion approaches 100% (as is the case in oxygen-rich, fuel-lean environments), absolute and equilibrium conversion is the same. "Equilibrium conversion" is defined in the classical manner, where the maximum attainable conversion is a function of the reactor temperature, pressure, and feed composition. In some embodiments, hydrocarbon equilibrium conversion is in the range of 70 to 100%. Hydrocarbon can be a mixture of hydrocarbons, or, in some embodiments, the term "hydrocarbon" could be replaced by "methane" in any of the descriptions herein. In the descriptions of preferred parameters for a multizone combustion process, the amounts of "hydrocarbon" (or contact time of hydrocarbon) are based on methane and it should be understood that for heavier fuels the flow rate would be reduced proportionately based on the conversion to $CO_2$ and $H_2O$; for example, for ethane the flow rate should be adjusted considering the stoichiometric ratio of oxygen to ethane now is 3.5 rather than 2.0 for oxygen to methane. So, if a patent claim states "a flow rate of 1.0 cc hydrocarbon", this means a flow rate of 1.0 cc methane or 0.57 cc ethane, etc.

In the $H_2$/CO zone, the maximum temperature is preferably 810° C. or less, more preferably 800° C. or less, and in some embodiments the temperature is in the range of 670° C. to 800° C. The partial pressure of $H_2$ is preferably at least 0.13 atm, in some embodiments in the range of 0.11 to 0.27 atm. The partial pressure of hydrocarbon is CO is preferably at least 0.044 atm, in some embodiments in the range of 0.04 to 0.1 atm. The partial pressure of hydrocarbon is preferably at least 0.071 atm, in some embodiments in the range of 0.064 to 0.16 atm. In some embodiments, mole fractions of hydrocarbon, $H_2$, CO, and $O_2$ are in the range of 0.06-0.08, 0.11-0.13, 0.04-0.05 and 0.1-0.12. Contact time of fuel (including both $H_2$ and hydrocarbon) in the $H_2$/CO zone is preferably 5 msec or less, more preferably 2.8 msec or less, and in some embodiments is in the range of 2 to 5 msec. Contact time of hydrocarbon in the $H_2$/CO zone is preferably 200 msec or less, more preferably 40 msec or less, more preferably 20 msec or less, and in some embodiments is in the range of 5 to 20 msec. Conversion of hydrocarbon in the $H_2$/CO zone is preferably at least 40%, more preferably at least 50%, and in some embodiments 40 to 60%. In some embodiments, relative amounts (by mole) of various components entering the $H_2$/CO zone are 50-100 parts hydrocarbon, 35-60 parts CO, 120-150 parts $H_2$, and 80-140 parts $O_2$ and in some embodiments, 60-90 parts hydrocarbon, 35-60 parts CO, 100-150 parts $H_2$, and 100-120 parts $O_2$. Through the $H_2$/CO zone, the hydrocarbon conversion is preferably at least 40%, in some embodiments 40 to about 70%, $O_2$ conversion is preferably at least 40%, oxygen selectivity to $H_2O$ is preferably 80% or less, more preferably less than 75%, and the oxygen selectivity of hydrocarbon to CO is the same or greater than the oxygen selectivity of CO to $CO_2$. For purposes of defining selectivity, $O_2$ is assumed to be used for converting CO to $CO_2$, $CH_4$ to CO and $H_2$, $H_2$ to $H_2O$, and $CH_4$ to $H_2O$. The percent of $O_2$ used to selectively oxidize each of above mentioned compounds is calculated as $O_2$ selectivity.

Defining [(exit flow rate $CO_2$)+(inlet flow rate methane−exit flow rate methane)+(exit flow rate $H_2O$)]=A $O_2$ selectivity to CO=(exit flow rate $CO_2$)×100%/A $O_2$ selectivity to $H_2$)=(exit flow rate $H_2O$)×100%/A $O_2$ selectivity $CH_4$ to CO=(inlet flow rate methane−exit flow rate methane)×100%/A In the POx zone, the maximum temperature is preferably 850° C. or less, in some embodiments 820° C. or less, and in some embodiments the temperature is in the range of 750 to 850° C. The partial pressure of $H_2$ is typically 0.02-0.07 atm. The partial pressure of CO is preferably at least 0.03 atm, in some embodiments in the range of 0.03 to 0.1 atm. The partial pressure of hydrocarbon is preferably at least 0.01 atm, in some embodiments in the range of 0.01 to 0.08 atm. In some embodiments, mole fractions of hydrocarbon, CO, and $O_2$ are preferably in the range of 0.01-0.04, 0.03-0.06 and 0.02-0.06, respectively. Contact time of hydrocarbon in the POx zone is preferably at least 1.5 times that in the $H_2$/CO zone, preferably 200 msec or less, more preferably 20 msec or less, and in some embodiments 10 to 20 msec. In some embodiments, relative amounts (by mole) of various components entering the POx zone are 15-50 parts hydrocarbon, 50-70 parts CO, 20-80 parts $H_2$, and 20-100 parts $O_2$, and in some embodiments, 10-70 parts hydrocarbon, 30-90 parts CO, 10-100 parts $H_2$, and 25-70 parts $O_2$. Conversion of hydrocarbon through the POx zone is preferably at least 35%, more preferably at least 50%, more preferably at least 60% and in some embodiments 40 to 80%. Conversion of CO through the POx zone is preferably 30% or less, more preferably 20% or less. Oxygen selectivity of hydrocarbon to CO through the POx zone is preferably at least 40%, more preferably at least 50%, and in some embodiments in the range of 40 to 50%.

In the afterburner zone, the maximum temperature is preferably 920° C. or less, in some embodiments 850° C. or less, and in some embodiments the maximum temperature is in the range of 750 to 900° C. The partial pressure of CO entering the afterburner zone is preferably at least 0.02 atm, in some embodiments in the range of 0.015 to 0.045 atm. The partial pressure of hydrocarbon entering the afterburner zone is preferably at least 0.006 atm, in some embodiments in the range of 0.005 to 0.015 atm. In some embodiments, mole fractions of hydrocarbon, $H_2$, CO, and $O_2$ are preferably in the range of 0.005-0.007, 0.006-0.008, and 0.04-0.05, respectively. In some embodiments, contact time of fuel in the afterburner zone is at least 3 times the contact time in the $H_2$/CO zone, preferably 1 sec or less, more preferably 500 msec or less, and in some embodiments is in the range of 50-500 msec. In some embodiments, relative amounts (by mole) of various components entering the afterburner zone are 1-20 parts hydrocarbon, 10-50 parts CO, 0-20 parts $H_2$, and 20-100 parts $O_2$, and in some embodiments, 2-10 parts hydrocarbon, 10-30 parts CO, 0-10 parts $H_2$, and 30-60 parts $O_2$. Conversion of hydrocarbon in the afterburner zone is preferably at least 93%, more preferably at least 95%, more preferably at least 99%, and in some embodiments 93 to 100%. Conversion of CO in the afterburner zone is preferably at least 93%, more preferably at least 95%, more preferably at least 99%, and in some embodiments 93 to 100%.

The amounts of gases in each zone refer to components entering a zone. So the simplest case would be where all the components enter a zone together; however, one or more components could also be added in a distributed fashion along the length of a zone, or be added mid-zone, etc., and these would also be counted as entering the zone.

In some preferred embodiments, the catalyst is characterizable by the levels of stability and/or reactivity shown in the examples. For example, the catalyst (or reactor) is characterizable such that when exposed to a gas composition of 2% $CH_4$, 4.4% $O_2$, 10% $H_2O$, at 0.68 msec contact time and 900° C. for 100 hours continuous TOS, more preferably after 300 hours continuous TOS, at least about 80% of the methane is converted. See FIG. 3.

In some embodiments, a catalyst's properties (such as stability, conversion and selectivity) are defined by the following test procedure (referred to as "Test Procedure 1") and is based on the reactions described in the Examples in the section entitled "Microchannel Insert Testing". Catalysts should be tested as (or on) an insert in the test reactor. Reactors and systems can be characterized by adjusting the flow rates to obtain the same contact times as in the run plans. In this test procedure (which can be further understood with reference to the Examples), the catalyst is coated on to a FeCrAlY or aluminized alloy 617 substrate which is inserted into a single microchannel test reactor with a 10 mil gap for the reactant gases. The catalysts are tested in three simulated gas compositions, namely H2/CO, POX, and Afterburner zones, where the gas compositions are shown in the table below:

TABLE 1

Reactor operation conditions including gas compositions, temperatures, and contact times.

| mole-f | kmol/s | O2 | CO2 | CH4 | H2O | H2 | CO | N2 | | O2/CH4 | O2/CO | in Tmin, C. | out Tmax, C. | Tave, C. | CT msec |
|---|---|---|---|---|---|---|---|---|---|---|---|---|---|---|---|
| H2/CO zone | 1.93E−06 | 0.109 | 0.243 | 0.071 | 0.000 | 0.124 | 0.044 | 0.409 | 1 | 1.54 | 2.46 | 675 | 800 | | 2.79 |
| POX-1(p-2 + j-6) | 2.14E−06 | 0.053 | 0.234 | 0.038 | 0.099 | 0.065 | 0.051 | 0.461 | 1 | 1.39 | 1.02 | 737 | 812 | 774.5 | 2.52 |
| POX-2(p-3 + j-7) | 2.34E−06 | 0.032 | 0.226 | 0.021 | 0.138 | 0.038 | 0.047 | 0.499 | 1 | 1.50 | 0.69 | 760 | 790 | 775 | 2.30 |
| POX-3 (p-4 + j-8) | 2.5E−06 | 0.024 | 0.223 | 0.013 | 0.153 | 0.024 | 0.039 | 0.523 | 1 | 1.80 | 0.62 | 790 | 825 | 807.5 | 2.15 |
| final jet (p-5 + j-9) | 3.21E−06 | 0.054 | 0.182 | 0.007 | 0.133 | 0.012 | 0.026 | 0.586 | 1 | 7.70 | 2.05 | 800 | 850 | 825 | 0.47 |
| post jet | 3.19E−06 | 0.047 | 0.190 | 0.006 | 0.141 | 0.007 | 0.020 | 0.590 | 1 | 7.34 | 2.38 | 830 | 900 | 865 | 8.99 |

The $H_2$/CO zone consists of $H_2$, CO, and $CH_4$ as fuel at $O_2/CH_4$ ratio of 1.54 and $O_2$/CO ratio of 2.46 and temperature range lies between 675 to 800° C. POX 1-3 zones consist of similar streams at $O_2/CH_4$ ratios ranging from 1.39-1.8 and $O_2/CO$ ratios ranging from 1.02-0.62 with temperature ranging from 737-825° C. In the post jet (afterburner zone), $O_2/CH_4$ ratio of 7.34 and $O_2/CO$ ratio of 2.38 and temperature range lies between 830 to 900° C.

TABLE 2

Testing Conditions at Various Run Points

| | Run number | | | | | | | | | |
|---|---|---|---|---|---|---|---|---|---|---|
| | 1 | 2 | 3 | 4 | 5 | 6 | 7 | 8 | 9 | 10 |
| CH4 flowrate (sccm) | 77 | 77 | 77 | 46 | 28 | 19 | 6 | 6 | 6 | 6 |
| CO flowrate (SCCM) | 48 | 48 | 48 | 61 | 61 | 55 | 20 | 20 | 20 | 20 |
| H2 flowrate (SCCM) | 136 | 136 | 136 | 78 | 50 | 34 | 7 | 7 | 7 | 7 |
| $CO_2$ flowrate (SCCM) | 0 | 0 | 0 | 0 | 0 | 0 | 0 | 0 | 0 | 0 |
| Air flowrate (sccm) | 567 | 567 | 567 | 303 | 203 | 162 | 225 | 225 | 225 | 225 |
| Water Flowrate Liq. (ml/min) | 0 | 0 | 0 | 0.1 | 0.15 | 0.17 | 0.12 | 0.12 | 0.12 | 0.12 |
| Water Flowrate Vapor (sccm) | 0 | 0 | 0 | 124 | 187 | 212 | 149 | 149 | 149 | 149 |
| Nitrogen flowrate (sccm) | 265 | 265 | 265 | 601 | 799 | 929 | 615 | 615 | 615 | 615 |
| Total Inlet Flowrate [WET](sccm) | 1093 | 1093 | 1093 | 1213 | 1328 | 1411 | 1022 | 1022 | 1022 | 1022 |
| TC17 (coupon - flow in) setting (° C.) | 675 | 725 | 800 | 775 | 775 | 800 | 800 | 825 | 850 | 900 |

To screen catalysts for different zones, tests were conducted at 3 temperature levels for $H_2/CO$ zone compositions (run 1-3), 1 temperature level for each of POX zone compositions (run 4-6), and 4 temperature levels for afterburner (AB) zone compositions (run 7-10) as shown in the table above. Runs 1-6 were typically tested in the first day and on the second day run 3 and 4 were repeated before testing runs 7-10. The target methane conversion was based on a need to provide a certain temperature profile to drive a steam reforming reaction in an integrated reactor. The methane target conversion is listed below:

TABLE 3

Target methane conversion in each run number.

| | Run number | | | | | | | | |
|---|---|---|---|---|---|---|---|---|---|
| | 1 | 2 | 3 | 4 | 5 | 6 | 7 | 9 | 10 |
| CH4 (%) | 41 | 41 | 41 | 38 | 33 | 14 | — | 95 | 95 |

EXAMPLES

General Techniques

In several examples, the support material was La-stabilized alumina derived from Sasol 14N4-80 Boehmite which was calcined at 1000° C. for 4 hrs. Precursor materials for metal solutions included perrhenic acid and tetraammineplatinum hydroxide. For Re-containing catalysts, a desired amount of perrhenic acid was impregnated first to incipient wetness and calcined at 450° C. for 1 hr, then tetraammineplatinum hydroxide was impregnated to incipient wetness and inter-calcined at 450° C. for 1 hr. Multiple impregnations were conducted and the final calcination temperature was between 850 to 1000° C.

Microchannel Insert Testing

Catalyst inserts were tested in a two inch long microreactor designed for fast screening of catalysts using an insertable coated coupon. The reactor is made from a 0.5" OD alloy 617 rod which is 2" long. The insertable coupons were made with either FeCrAlY or aluminized (CVD of alumina layer) alloy 617 and sized to 1.0"×0.375"×0.02". A slot sized 0.377"×0.021"×2" was cut at the center to fit the insert and another slot adjacent to the insert is EDM (electro discharge machining) wire cut at 0.335"×0.01"×2" for reactant gases to flow by the catalyst insert.

Before catalyst coating, FeCrAlY coupons were heat treated in air at 1000° C. for 8 hrs to grow native aluminum oxide. A alumina support (typically stabilized) and a catalyst metal (or metals) were added. Upon loading the coated coupon into the reactor ¼"OD tube header and footer were attached to the reactor using ½" swagelock fittings to be connected to the test stand.

In some examples, the heat treated inserts were coated with slurry catalyst. In some examples, powder catalysts were ball milled for 24 hrs in slurry whose pH was adjusted to 4, 5 wt % solid content of Boehmite (18N4-80, Sasol) was added to the slurry before coating to the coupon, and the catalyst loading was targeted at 15 mg/in$^2$.

In the examples, catalysts having supports made from fumed alumina were made by a process including three steps: 1) preparation of the support from 80% fumed alumina and 20% sol alumina, 2) stabilization of the support with La or Mg, and 3) impregnation of the stable support with active metal via incipient wetness. Two different approaches were used to insert of the catalyst in the microchannel devices: (A) Preparation of the final catalyst powder in a slurry with particle size less than 10 micron, and washcoating the microchannels with the catalyst slurry; or (B) The three steps take place directly on the microchannel: The microchannel is washcoated with fumed alumina and sol alumina slurry, followed by treatment with a solution of La or Mg, and finally treatment with active metal precursor. For option (B) several calcination and washcoating cycles were used to increase metal loading in a given geometric surface area of support.

An example of a protocol for making a combustion catalyst from fumed alumina is as follows:

The following recipe is given for preparation of 206 grams of ceramic support and 130 gram of catalyst metal 1) Measure % moisture of fumed alumina and sol alumina, it should be less than 1%
2) If the % moisture is more than 1% then pre-calcine the material for 4 hour at 300° C. before going to step #3.
3) Weigh 158.1 grams of fumed alumina (Spectral 51 fumed alumina from Cabot). When weighing out fumed alumina, use a large volume container (2 L beaker). Always weigh in a fume hood while wearing a dust-mask.
4) Under mechanical stirring pour slowly the fumed alumina into 730 g deinoized water. Mix thoroughly to avoid clumping of powder/fumed alumina (4 L beaker).

5) Once the fumed alumina is well dispersed in the water add slowly 41.9 g of 14N4-80 sol alumina from Sasol (Boehmite). Allow the mixture to blend for 15 min
6) Dry the slurry for 48 hours at 120° C.
7) Grind the resultant support to less than 100 meshes using a mechanical grinder.
8) Calcine the resultant material for 4 hrs at 450° C. at 5° C. per min.
9) Grind the resultant support to less than 100 mesh (if necessary)
10) Measure the pore volume of the alumina support, BET area and particle size distribution Impregnate the powder with aqueous solution of 12% La nitrate hexahydrate via incipient wetness so that the final composition of the support is 3%(+/−0.2)La/97% $Al_2O_3$. Dissolved 19.28 g % La nitrate hexahydrate into 140 g of DI water.
    One impregnation was necessary to get the right loading
11) Dry the support at 100° C. for 1 hr.
12) Calcine the support material at 1000° C. for 4 hours at 5° C. min (under static air).
13) Grind the support to less than 100 mesh.
14) Impregnate 3% La/$Al_2O_3$ support with solution of $Pt(NH_3)_4(OH)_2$ (9.09% Pt metal content) via incipient wetness so that the final catalyst has 30% Pt (w/W). This took 6 impregnations.
    To prepare 120 gram of 30% Pt/(3% La/$Al_2O_3$) 471.5 grams of $Pt(NH_3)_4(OH)_2$ (9.09% Pt metal content) is needed.
    The composition of the catalyst (w/w) is:
    30% Pt (metal)+70% total support (6% La(metal)+94% Alumina oxide)
15) After each impregnation
    Dry the catalyst at 100° C. for 1 hr.
    Calcine the catalyst at 450° C. for 1 hr at 5° C./min.
16) Repeat steps 13-15 until a loading of 30% Pt is reached (6 impregnation cycles of Pt are needed).
17) After the last impregnation calcine the catalyst at 850° C. for 4 hours at 5° C./min.
18) Sieve the catalyst to less than 100 mesh.

Method of Making the Catalyst Slurry:

19) Blend 100 grams of catalyst+400 grams of water+1000 gram of alumina grinding media (6 mm).
21) Ball mill the slurry prepared in step 20 for 50 hours
22) Measure the distribution of the particle size. If the particle size is less than 10 μm, then proceed to the next step. If not, continue ball mill until all particles are less than 10 μm
23) Measure pH, viscosity and density of the slurry.
24) If it is necessary, add a minimum amount of pure acetic acid to drop viscosity to less than 10 cP.

Effect of Metal Loading on Metal Dispersion for Pt-Based Catalysts

Figure 2:
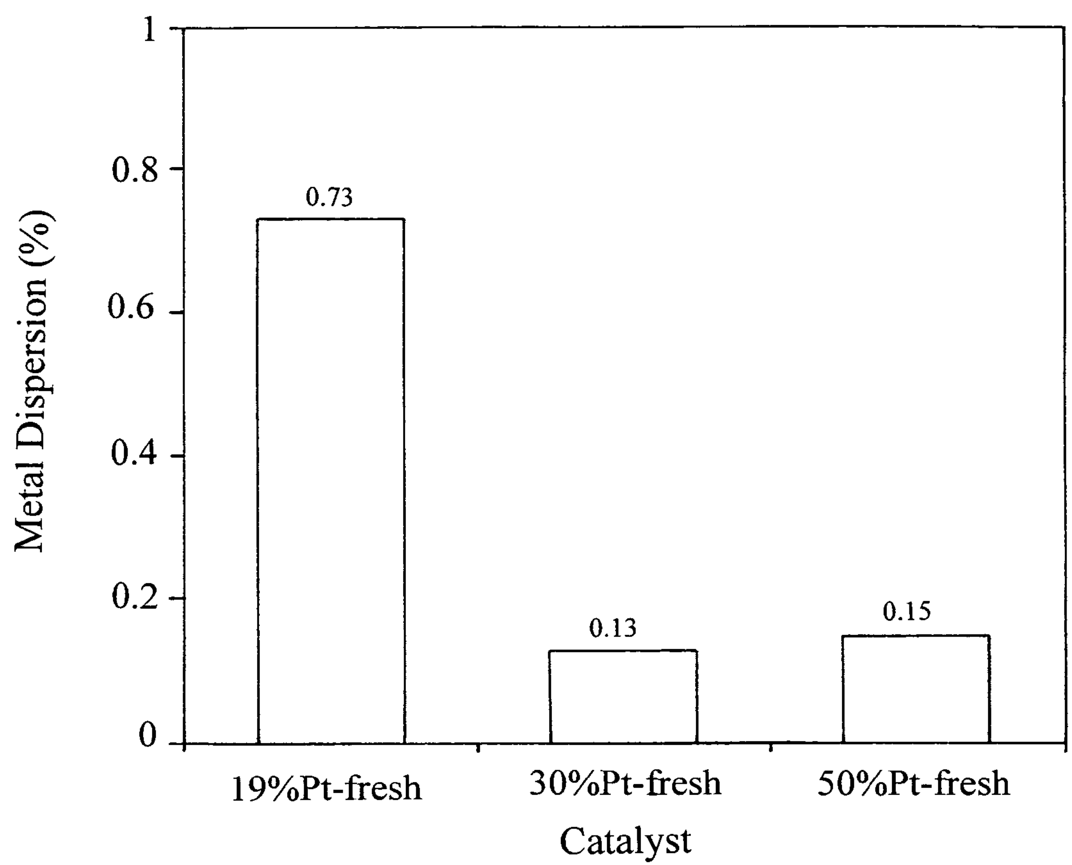
FIG. 2 shows the effect of Pt loading on Pt dispersion in Pt-based catalysts.

This example shows benefits of increasing Pt loading beyond 20 wt %. FIG. 2 shows that the dispersion of the 19% Pt catalyst is about five times higher than that of the 30% Pt or 50% Pt catalysts. It is believed that the more metal is loaded to the surface, the more difficult it will be to disperse, thus forming big agglomerations. The difference in the dispersion of 30% Pt and 50% Pt catalysts is almost negligible, within the experimental error limits. Thus we conclude that there is not too much additional drop in metal dispersion once the loading surpasses 30%. The method of preparation of the 50% Pt catalyst was different than the other two, because Pt "black" and alpha alumina (Engelhard) were mixed and bound by 5 wt % Boehmite (18N4-80, Sasol) as opposed to depositing $Pt(NH_3)_4(OH)_2$ precursor onto 3% La—$Al_2O_3$ support by the incipient wetness technique.

Powder Catalyst Lifetime Screening 30 mg of catalyst was packed in a ¼"OD quartz reactor diluted with SiC and tested for lifetime/screening. The reaction conditions were: 2% $CH_4$, 4.4% $O_2$, 10% $H_2O$, 0.68 msec. Reaction temperature was 850° C. as the integrated microchannel device is expected to operate at less than 850° C. in the majority of the reactor.

Figure 3:
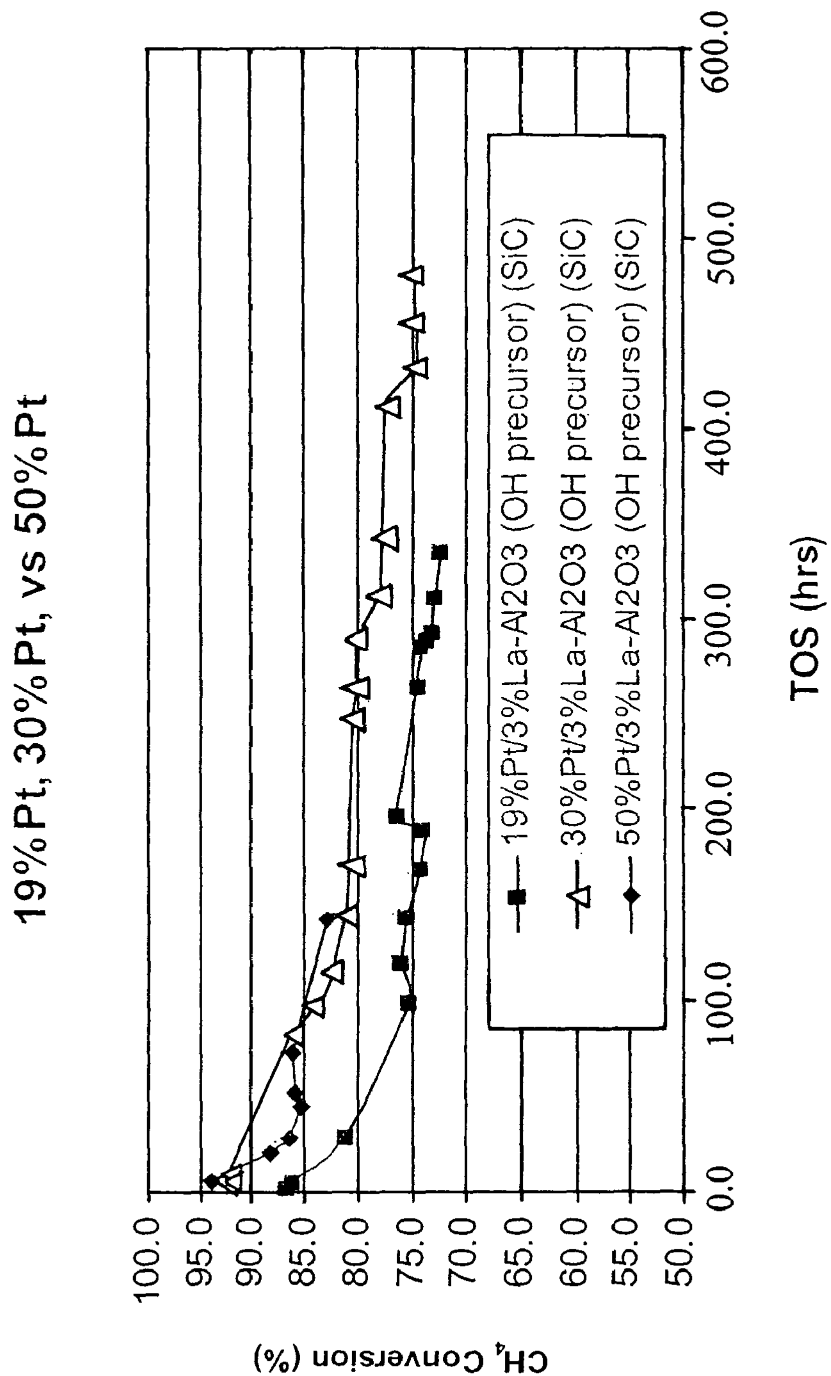
FIG. 3 shows the effect of platinum loading on a catalyst tested with a gas composition of 2% $CH_4$, 4.4% $O_2$, 10% $H_2O$, at 0.68 msec contact time and 900° C.

Effect of Pt loading:

FIG. 3 shows the effect of Pt loading supported on La stabilized alumina impregnated with tetraammine platinum hydroxide. The initial activity of the 50% Pt catalyst was lower than the 30% Pt catalyst but at 150 hours of operation, the activity was found very similar to the latter catalyst. We found that the light off temperature was lowered with increased Pt loading. Having more Pt (therefore larger particle size) resulted in a more active and stable catalyst.

Figure 4:
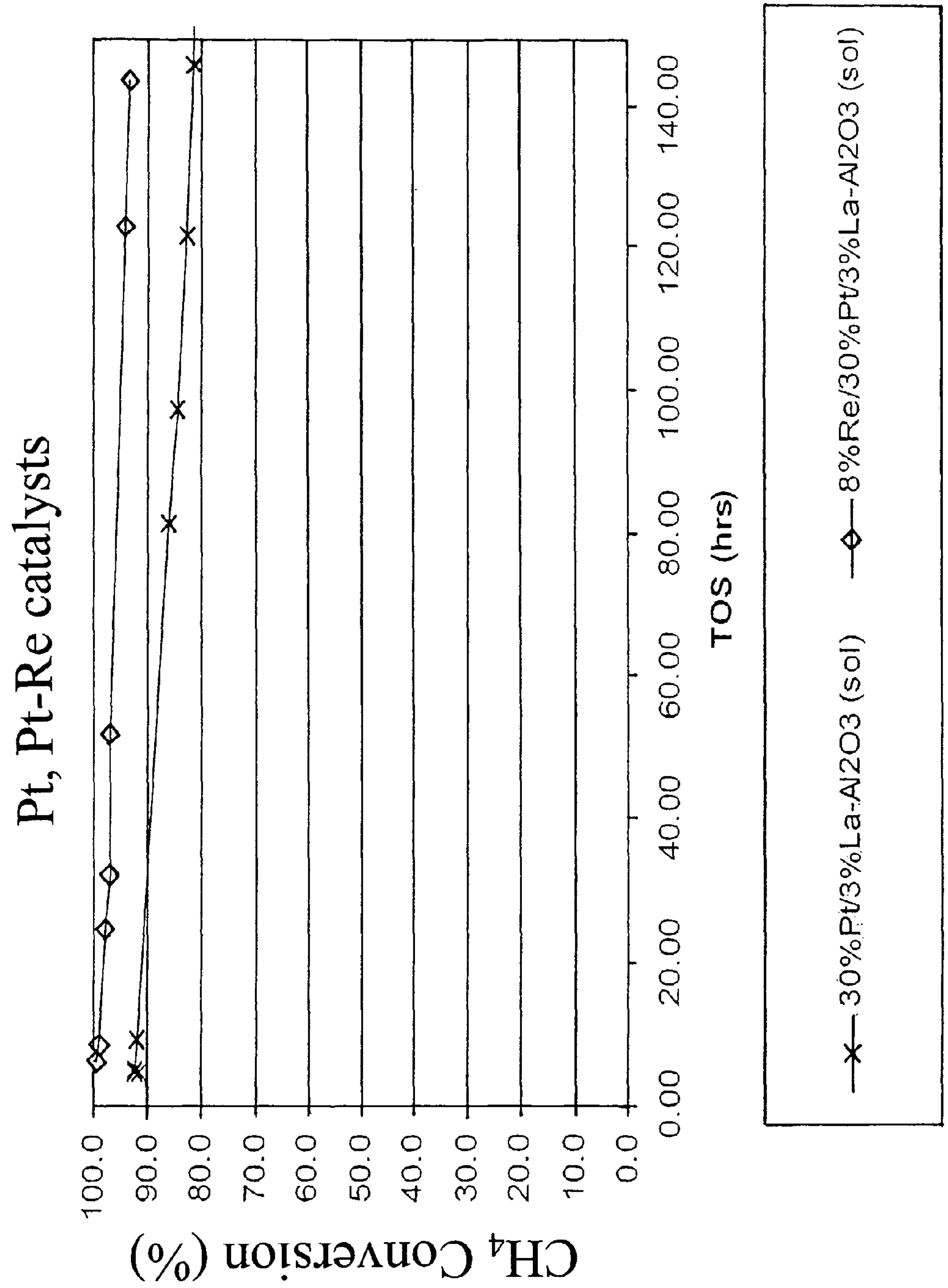
FIG. 4 shows the effect of adding Re to the Pt catalyst. Testing conditions (mol %): 2% $CH_4$, 4.4% $O_2$, 10% $H_2O$, 0.68 msec contact time and 850° C.

Effect of Re:

Pt and Pt—Re, each supported on La-stabilized fumed $Al_2O_3$ were compared at 850° C.; results are shown in FIG. 4. All catalysts in this case were calcined at 1000° C.

Figure 5:
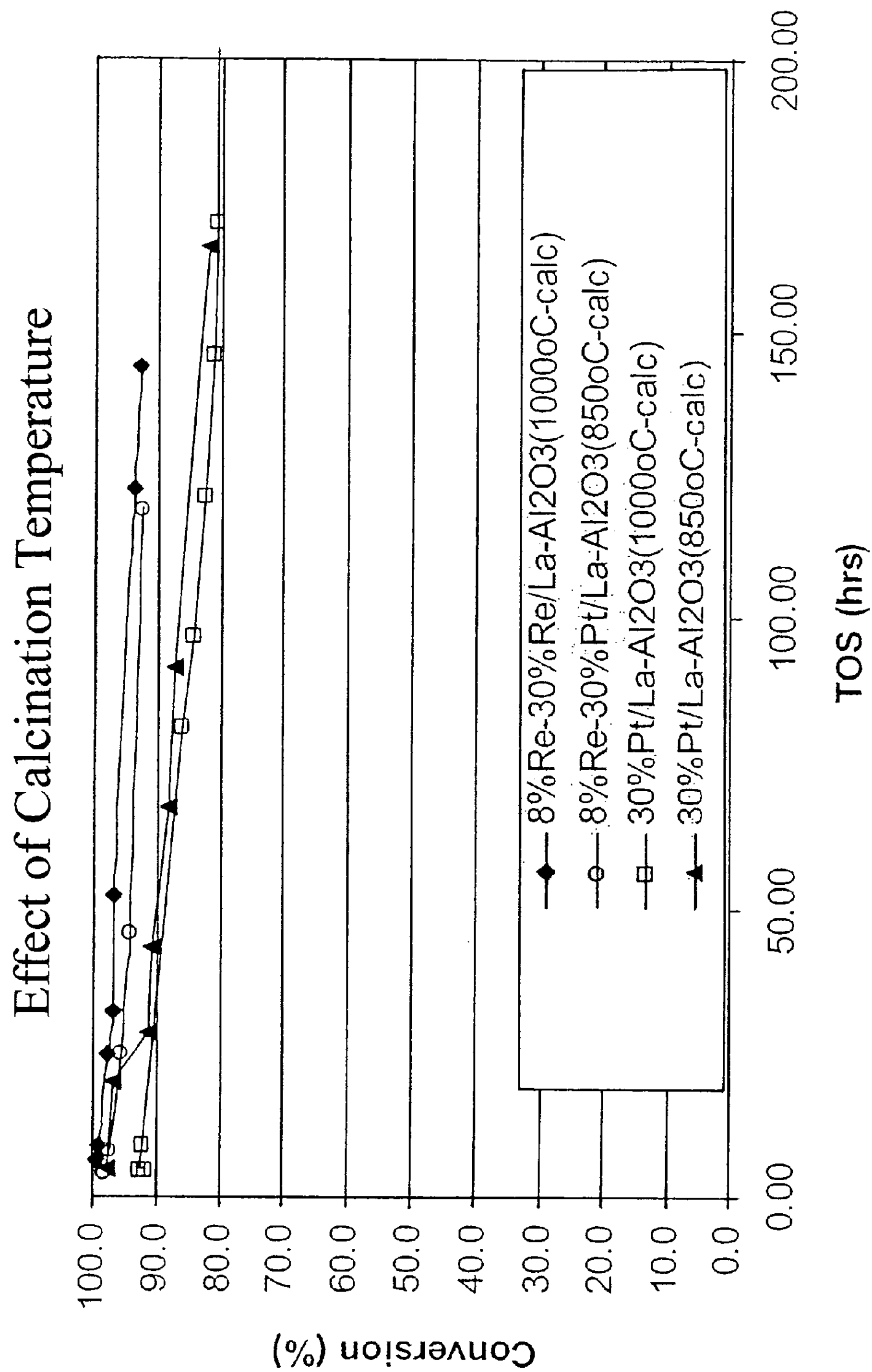
FIG. 5 shows methane conversion over 30% Pt and 8% Re-19% Pt on 3% La—$Al_2O_3$ catalysts that were calcined at 850° C. and 1000° C. and tested under fuel lean conditions (2% $CH_4$, 4.4% $O_2$, 10% $H_2O$) at a contact time of 0.68 msec.

The effect of calcination temperature was studied on 30% Pt and 8% Re-19% Pt on 3% La—$Al_2O_3$. The catalysts were calcined at 850° C. and 1000° C. were tested for over 120 hours under fuel lean conditions (2% $CH_4$, 4.4% $O_2$, 10% $H_2O$) at a contact time of 0.68 msec. Under these conditions, the catalyst calcined at 850° C. exhibited similar methane conversion as the catalyst calcined at 1000° C. Lowered calcination temperature was found to decrease the light off temperature of the catalyst. Results are shown in FIG. 5.

Figure 6:
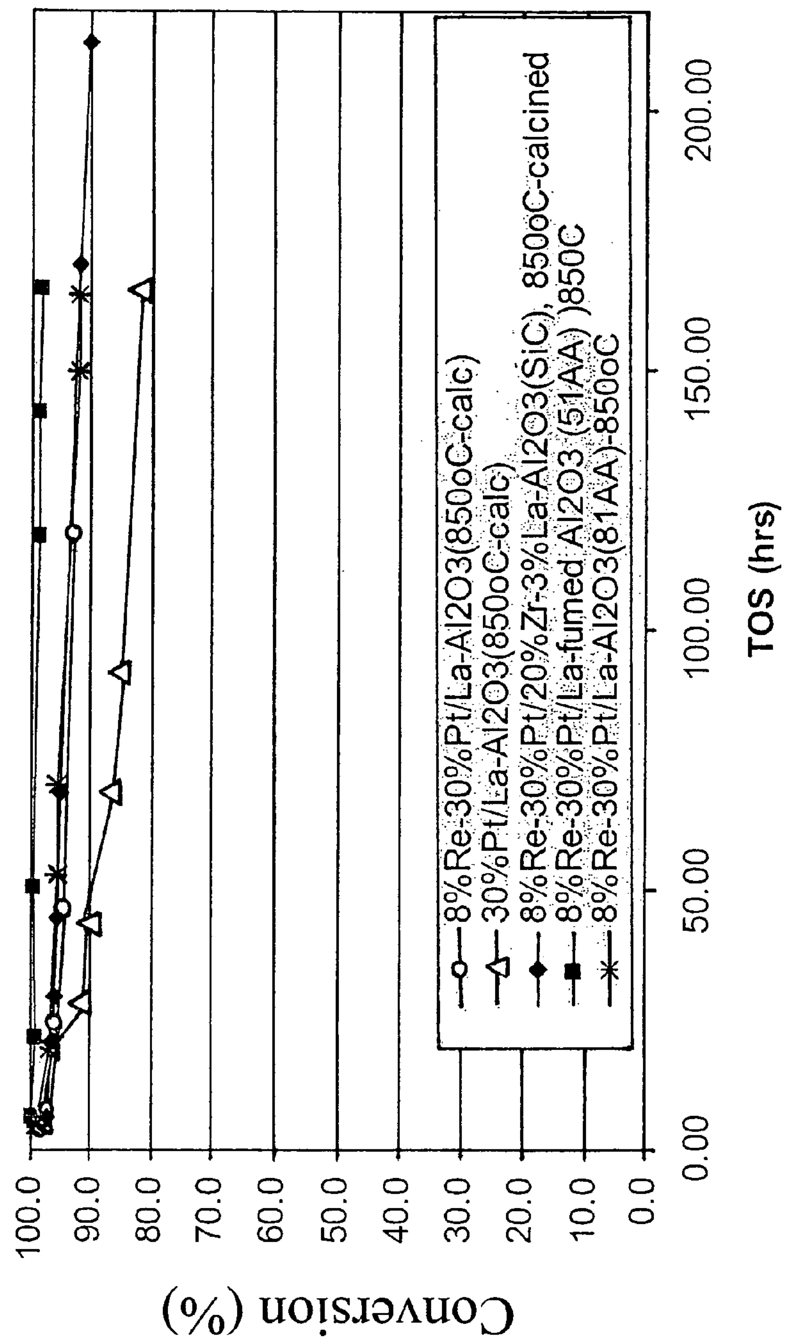
FIG. 6 shows conversion vs time on stream (TOS) for Pt and Re—Pt powder catalysts on various support materials.

Effect of Supports:

FIG. 6 shows the results of lifetime screening for several formulations. The lowest conversion was the baseline performance of 30% Pt/La—$Al_2O_3$ (sol) calcined at 850° C. Initial methane conversion was high at 95+% but in 150 hours on stream, activity declined to 80% level. When Re was incorporated into the 30% Pt/La—$Al_2O_3$ (sol) catalyst calcined at 850° C., the stability of the catalyst was improved and at 100 hours, the conversion level was 7-8% higher than that of 30% Pt. When Zr was incorporated into the support material, the conversion profile looked very similar to the Re—Pt catalyst without Zr. When the same catalyst was supported on La-stabilized fumed alumina (81AA—acetic acid treated fumed alumina with a surface area of 81 $m^2/g$), again the conversion profiled looked identical to sol-derived supports with or without Zr. In some tests SiC was added to improve thermal transfer to the powder. However, the catalyst supported on La-stabilized fumed alumina (51AA) enhanced the stability significantly. Light-off testing was conducted before the material was subjected to the conditions of lifetime screening. The 8% Re-30% Pt catalyst supported on La-fumed alumina (51AA) showed the lowest light off temperature. Compared to the rest of the catalysts, the light off temperature was as much as 100° C. lower and it shows that the catalyst activity is higher on this catalyst.

Figure 7:
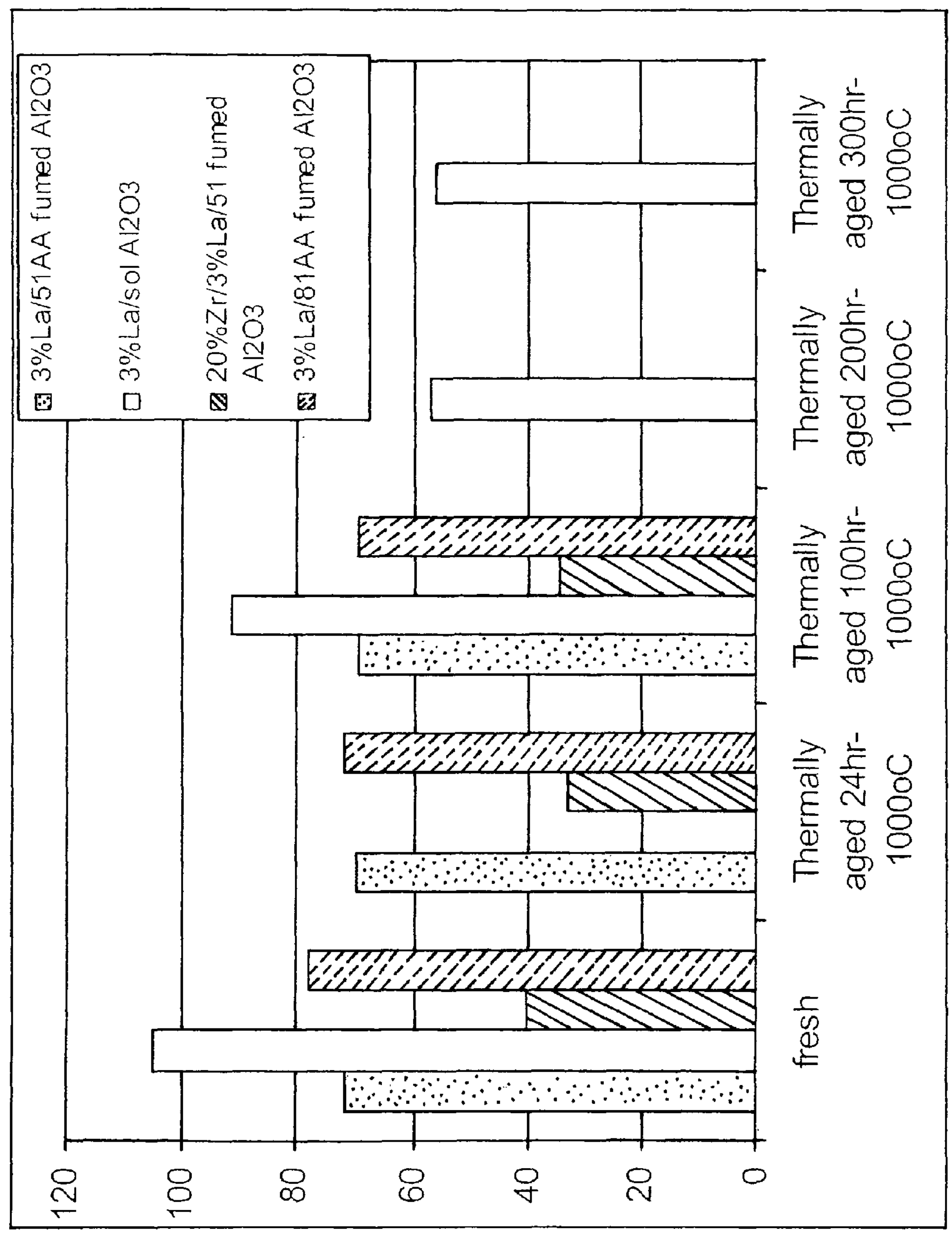
FIG. 7 shows BET surface area of 4 support materials as a function of aging time.

FIG. 7 shows the BET surface area of various support materials at aging times of 0, 24, and 100 hours. Aging of the materials was carried out in air at 1000° C. The highest initial surface area was achieved with La-stabilized alumina derived from sol. However, a decrease in surface area was observed until 200 hrs. For fumed alumina containing supports, the initial surface area was lower on both 81 AA and 51 AA; however, the relative change within 100 hrs was significantly smaller than the La/alumina (sol) sample. Surprisingly, the 51AA support was more stable than the 81AA sample. When Zr was incorporated into the La-fumed alumina (51), the initial surface area was the lowest among all four samples but appeared stable. Thus, applicants have shown that an active catalyst can be prepared on a support that is highly thermally stable with a surface area that changes by 10% or less (preferably 5% or less) after exposure to air for 24 hour.

Figure 8:
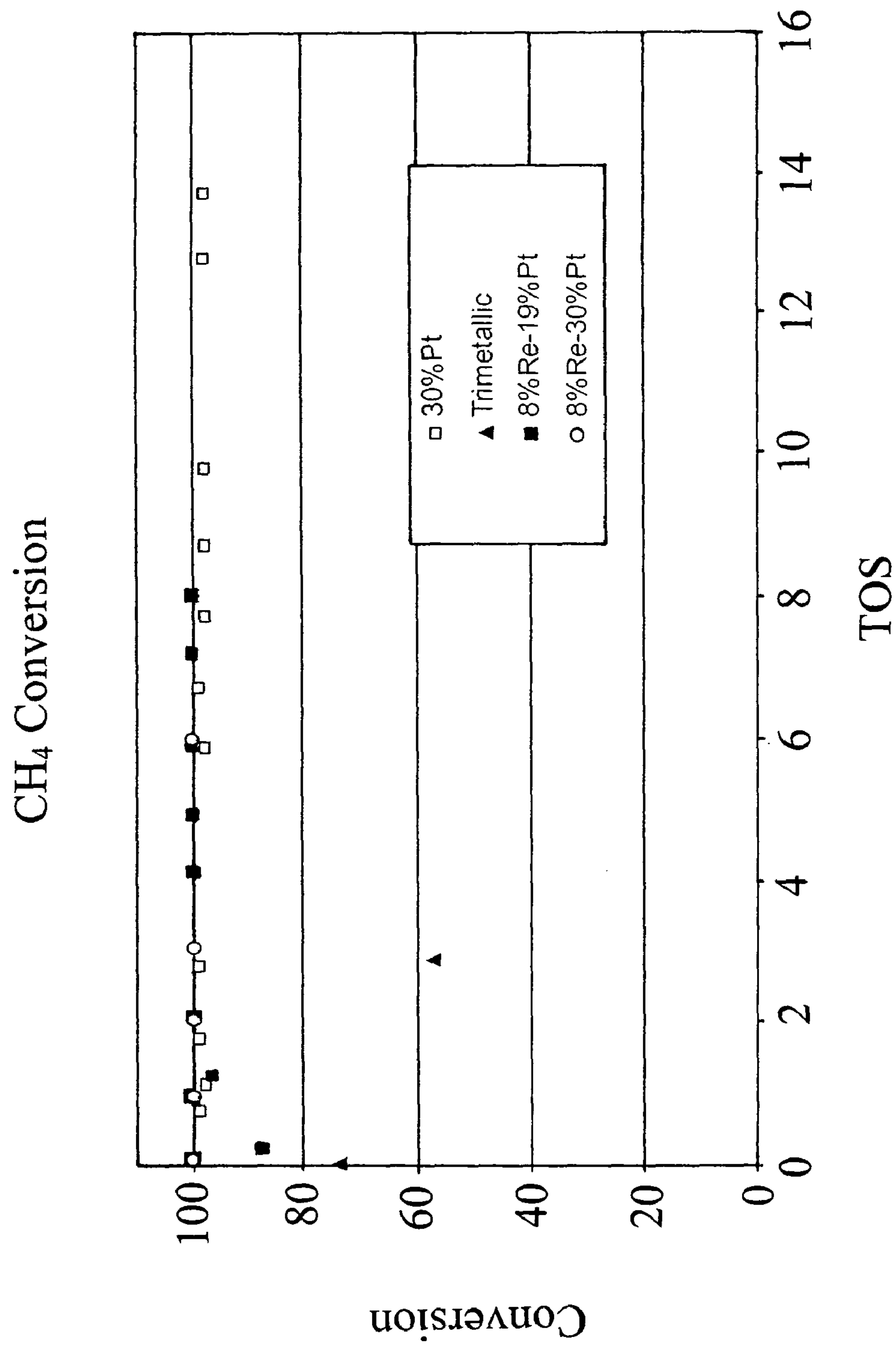
FIG. 8 shows methane conversion through various powder catalysts under fuel lean conditions (0.6% $CH_4$, 4.7% $O_2$, 2% CO, 0.7% $H_2$, 14% $H_2O$, 850° C., CT=9 ms).

FIG. 8 shows the activity of catalysts under afterburner zone conditions (0.6% $CH_4$, 4.7% $O_2$, 2% CO, 0.7% $H_2$, 14% $H_2O$, 850° C., 9 ms) for methane conversion. The catalysts tested were 30% Pt, 8% Re-19% Pt, 8% Re-30% Pt, and trimetallic catalysts (19% Pt/10% Pd/7% Rh/3% La—$Al_2O_3$). All catalysts outperformed the trimetallic catalyst. The presence of Rh and/or Pd inhibited the catalytic activity under these conditions.

Figure 9:
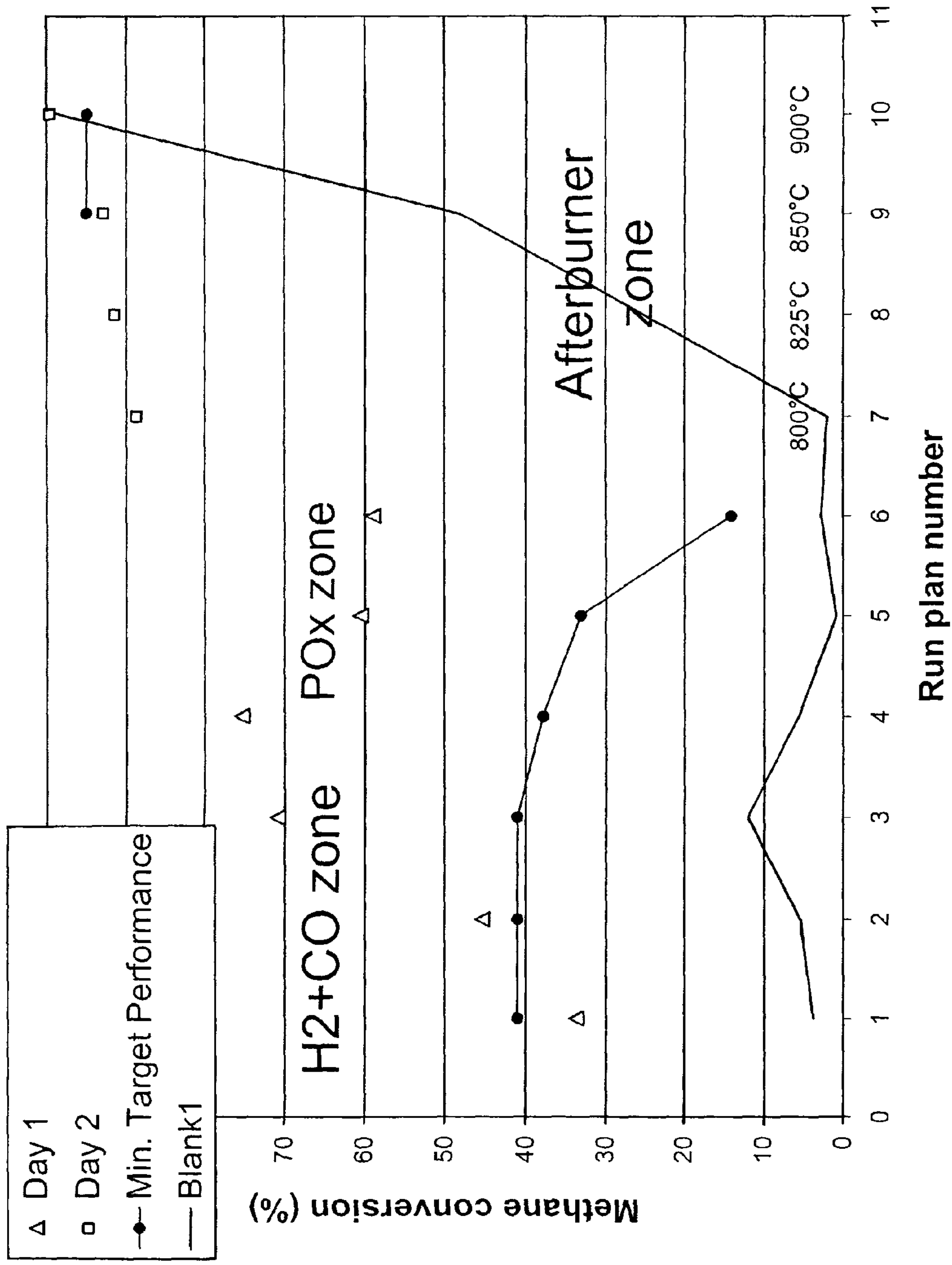
FIG. 9 shows performance of 30% Pt on La-stabilized fumed alumina (51 $m^2/g$) on FeCrAlY in a microchannel test apparatus: (a) methane conversion; (b) CO conversion; (c) $O_2$ conversion; and (d) $O_2$ selectivity.
Figure 9:
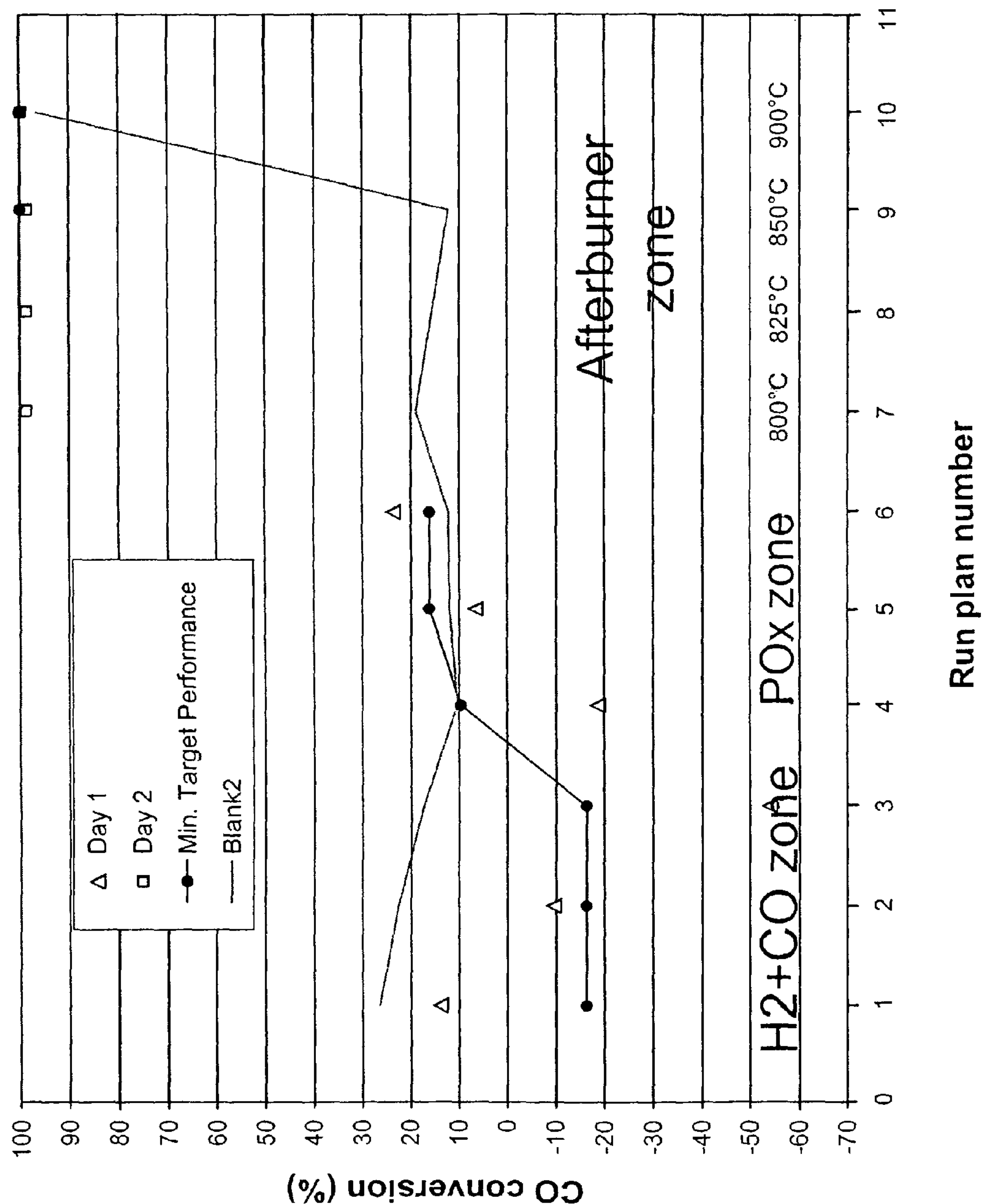
Figure 9:
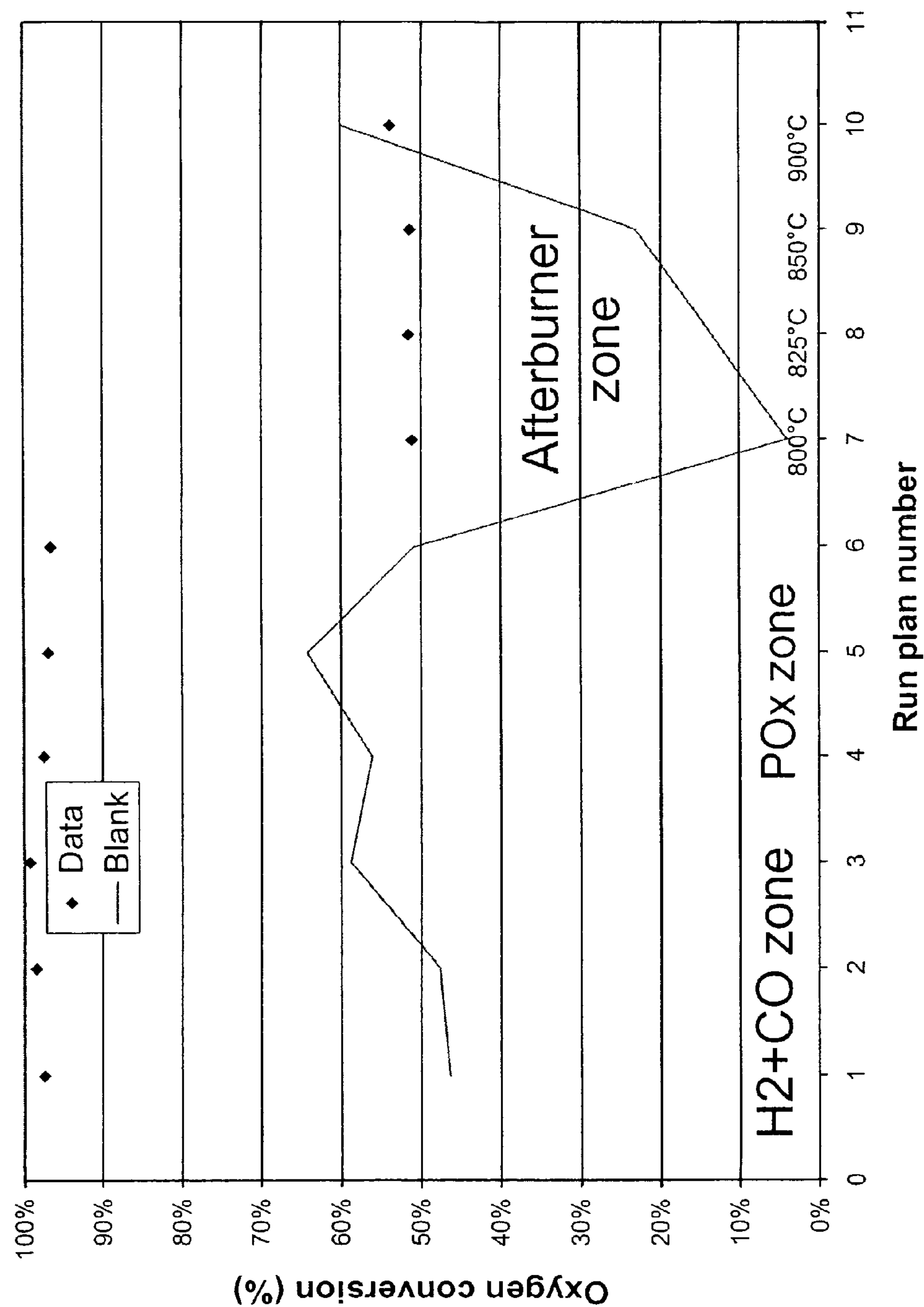
Figure 9:
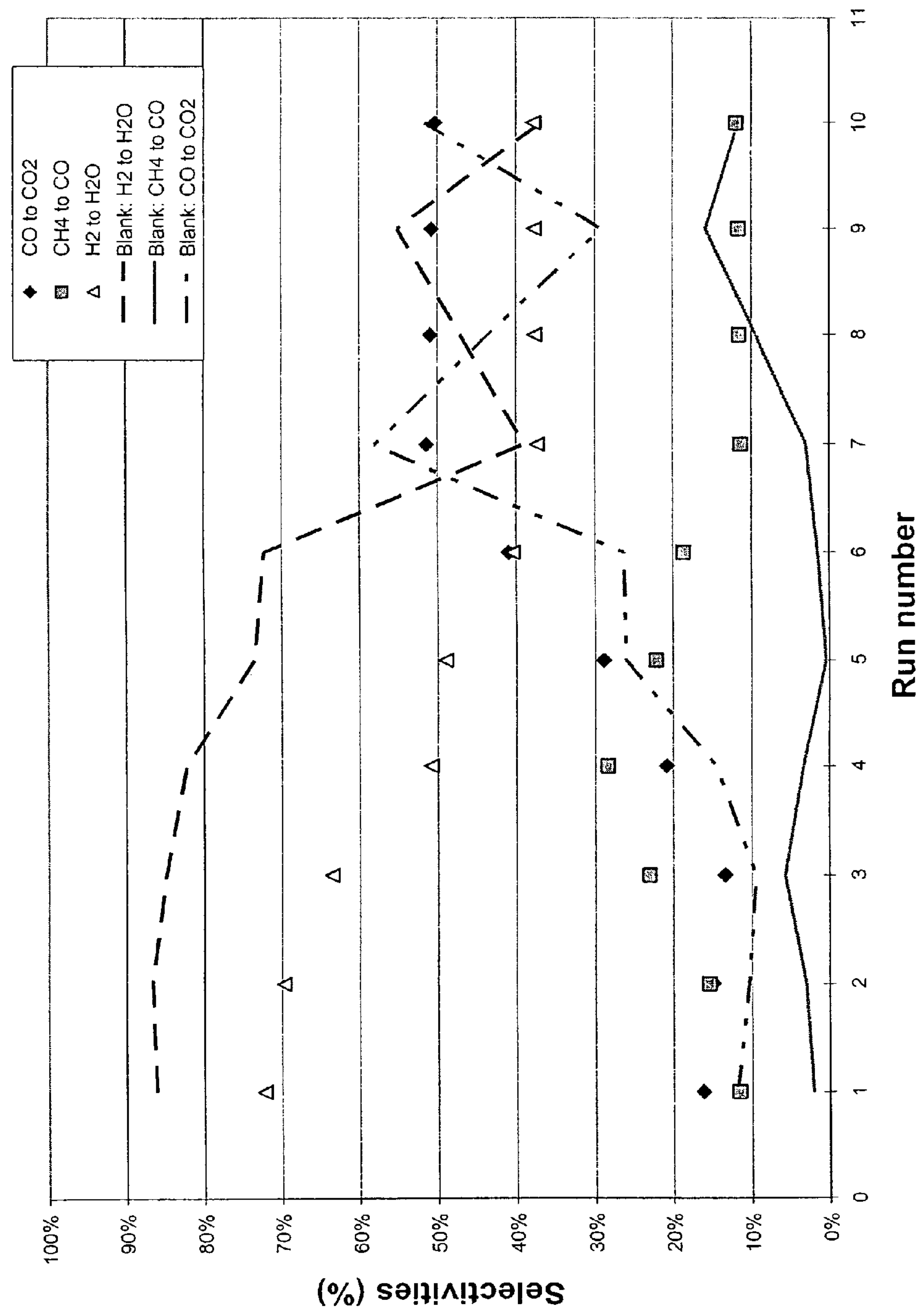

Initial Activity Screening in Microchannel Insert Test Device Performance Testing over Fumed Alumina FIGS. 9(*a-d*) are the results for 30% Pt/La-fumed alumina (51 $m^2/g$) calcined at 850° C. on FeCrAlY substrate. High methane conversion in the Pox zone was obtained and the target conversion was met in the afterburner zone except for the point 9. Complete CO conversion was obtained in the afterburner zone; however, 100% utilization of oxygen was not attained in the H2/CO and Pox zones. Methane was selectively converted over CO in points 2 through 4.

Figure 10:
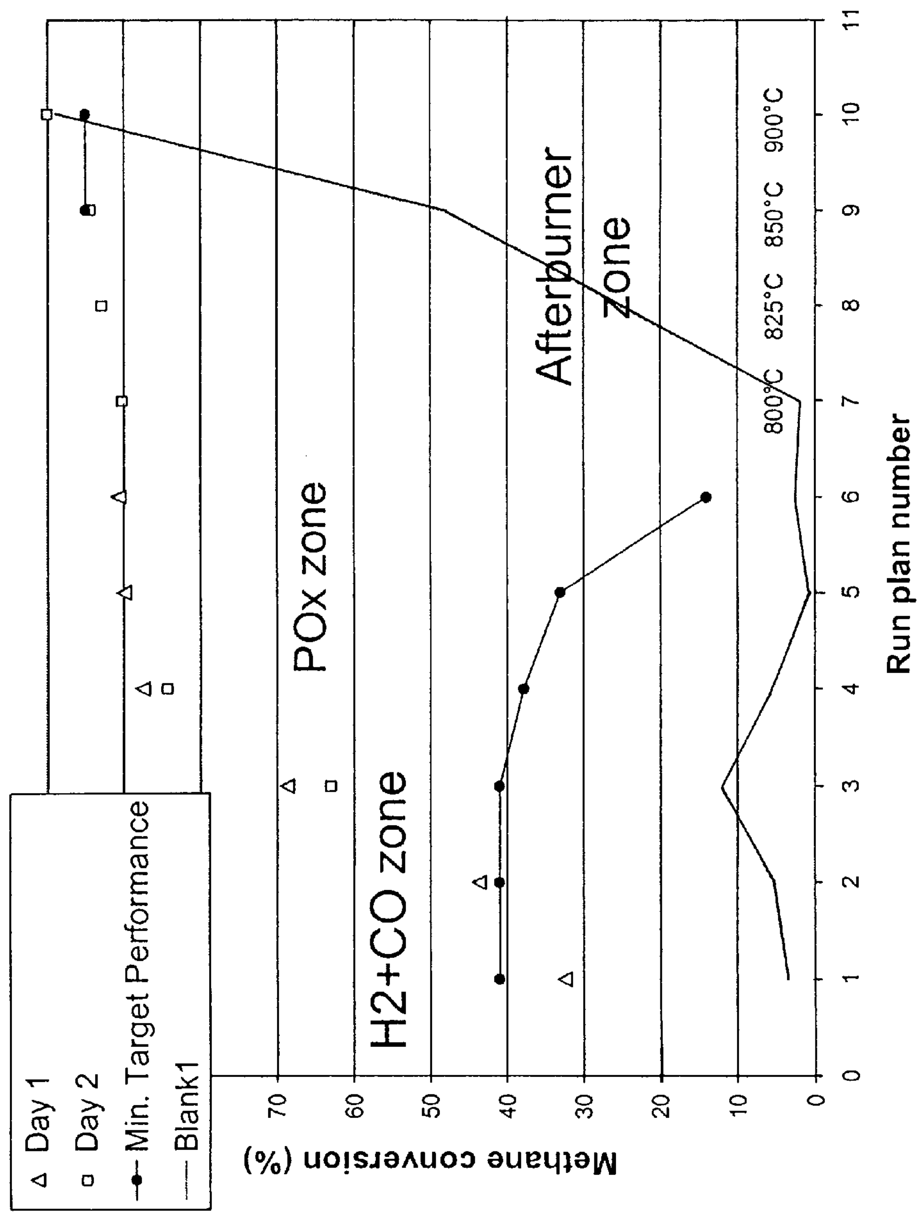
FIG. 10 shows performance of 30% Pt on La-stabilized fumed alumina (81 $m^2/g$) on FeCrAlY in a microchannel test apparatus: (a) methane conversion; (b) CO conversion; (c) $O_2$ conversion; and (d) $O_2$ selectivity.
Figure 10:
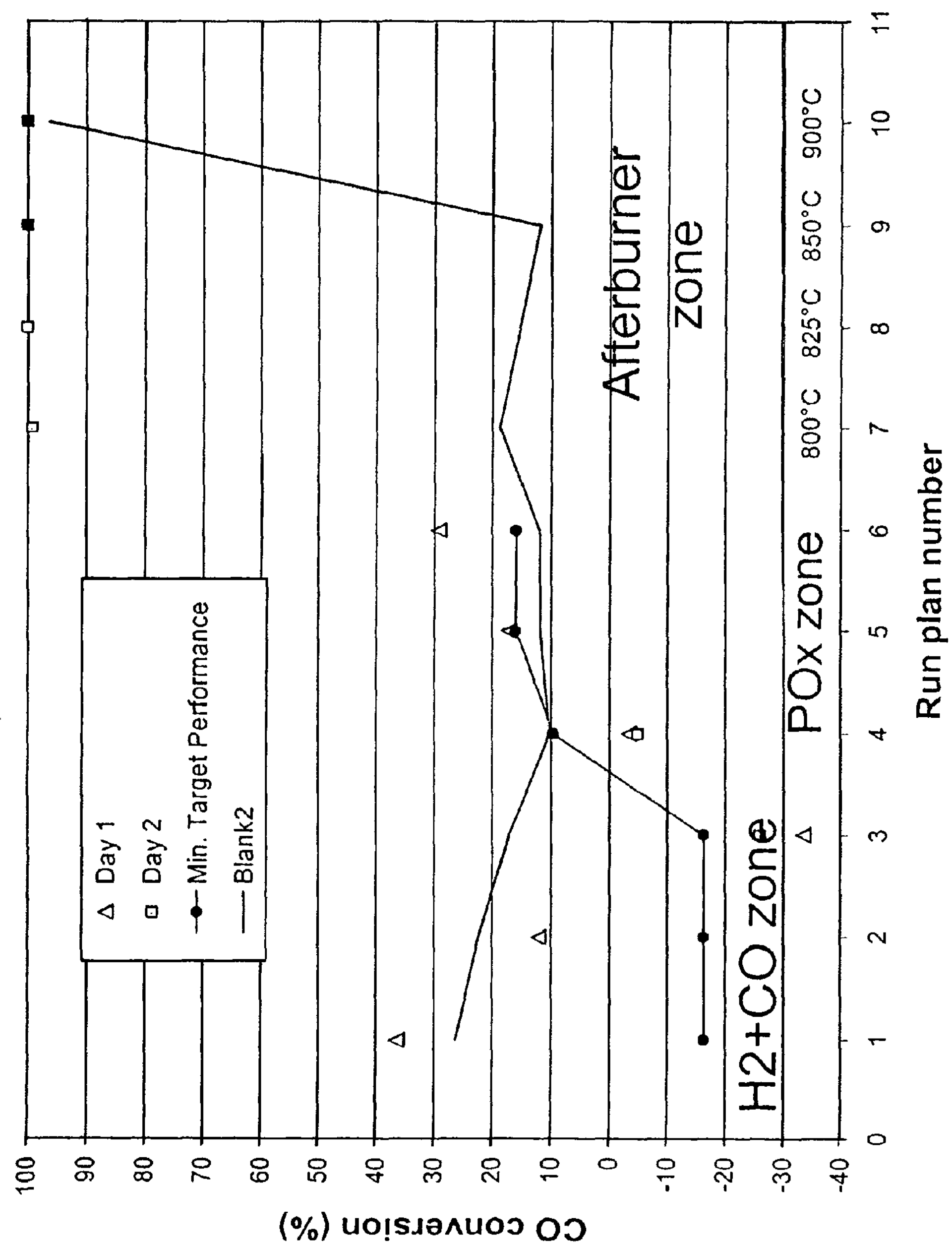
Figure 10:
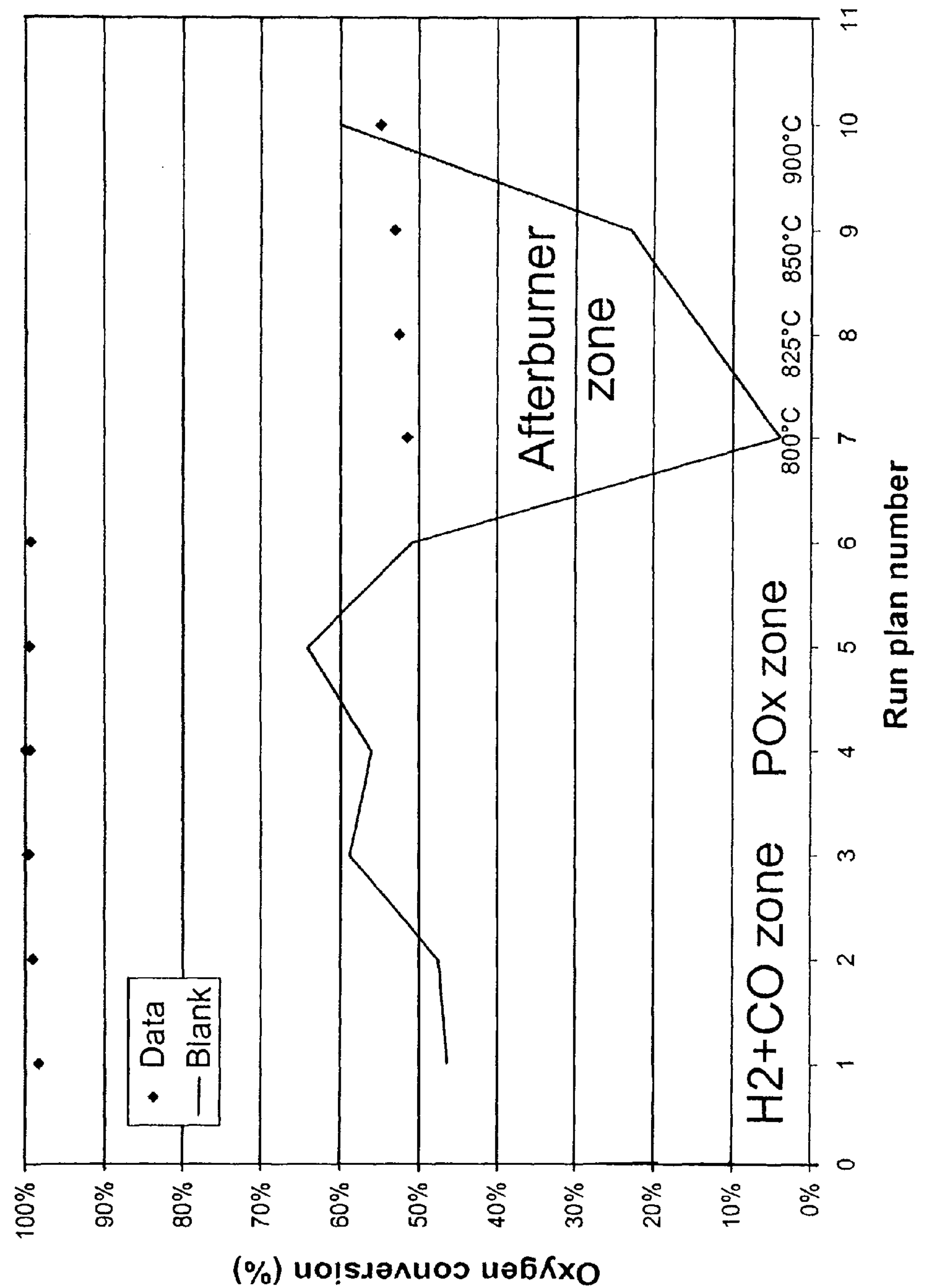
Figure 10:
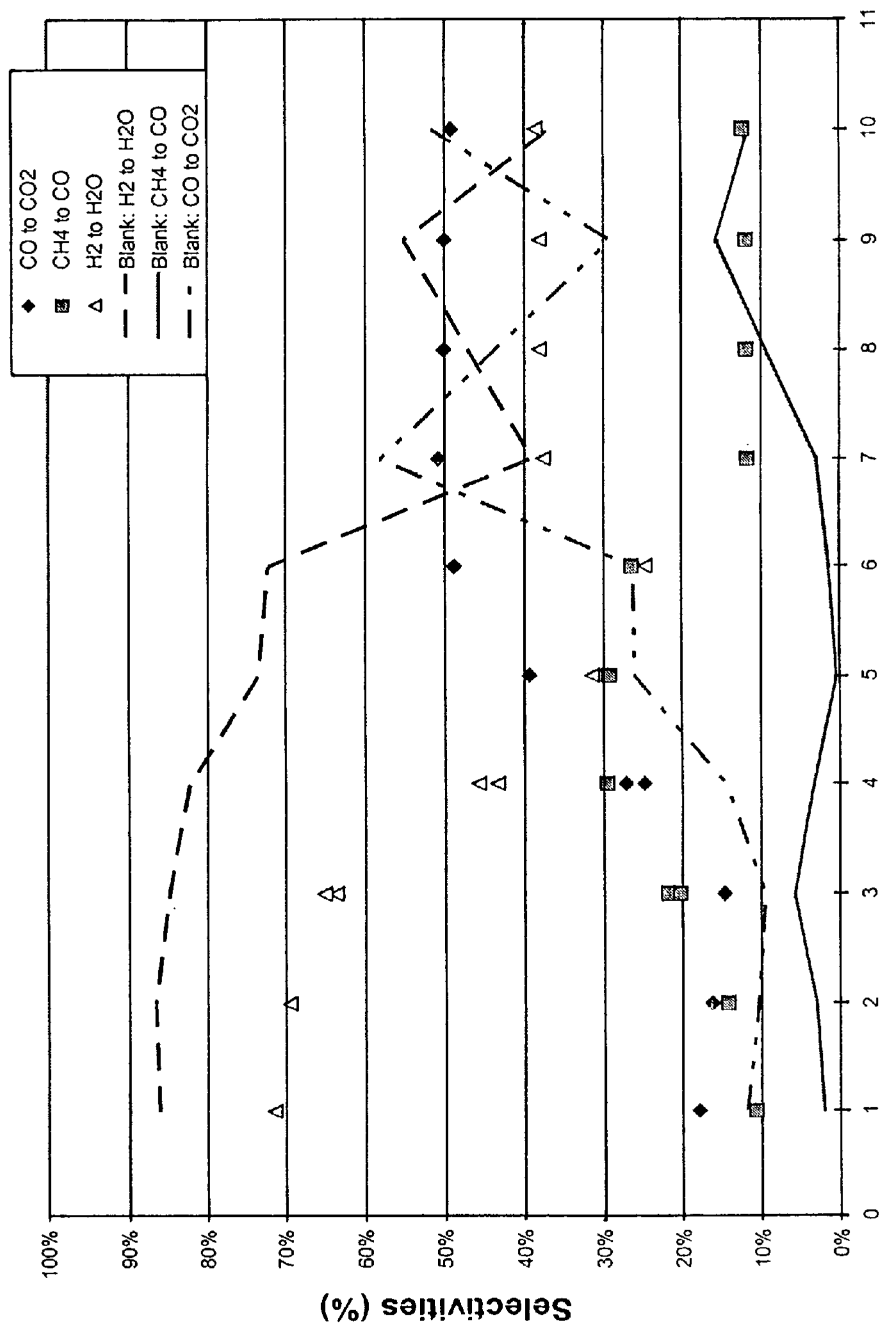

FIGS. 10(*a-d*) show data for 30% Pt/La-fumed alumina (81AA) calcined at 850° C. on a FeCrAlY substrate. Compared to the fumed alumina (51 $m^2/g$) supported catalyst in FIG. 9, the initial activity in $H_2$/CO and Pox zones for methane conversion was significantly improved. Particularly in the POX zone, near 90% conversion was achieved. Oxygen utilization (conversion) was also improved in these zones. In the afterburner zone, activity was about the same regardless of the type of fumed alumina. The $2^{nd}$ day data for run points 3 and 4 (last part of H2/CO and first part of POX zone) showed some deactivation of the catalyst took place.

Figure 11:
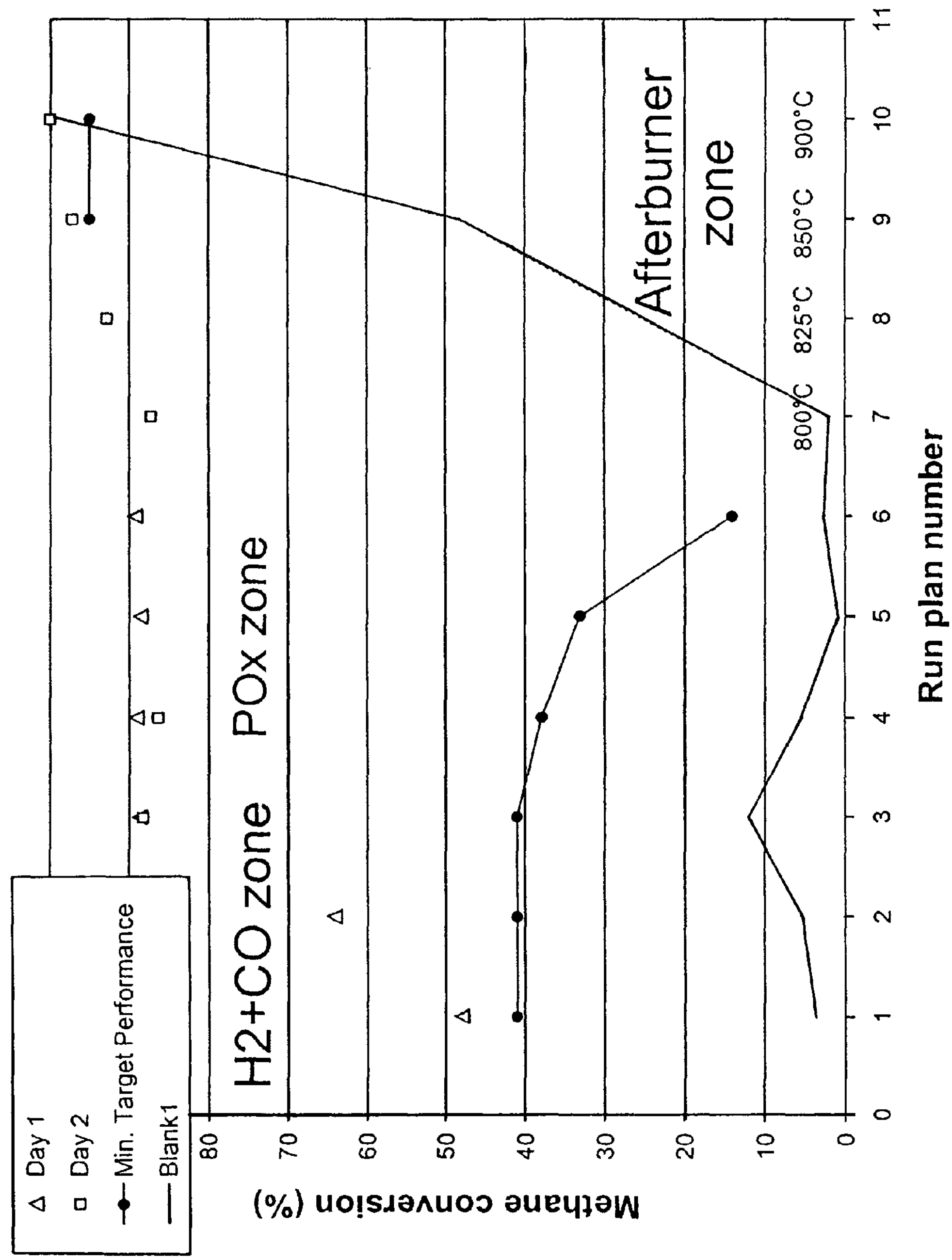
FIG. 11 shows performance of 30% Pt on La-stabilized fumed alumina (81 $m^2/g$) on FeCrAlY in a microchannel test apparatus: (a) methane conversion; (b) CO conversion; (c) $O_2$ conversion; and (d) $O_2$ selectivity. In this example, the FeCrAlY was initially coated with an aluminum layer (by CVD) and an oxide layer grown from the aluminized layer prior to depositing Pt.
Figure 11:
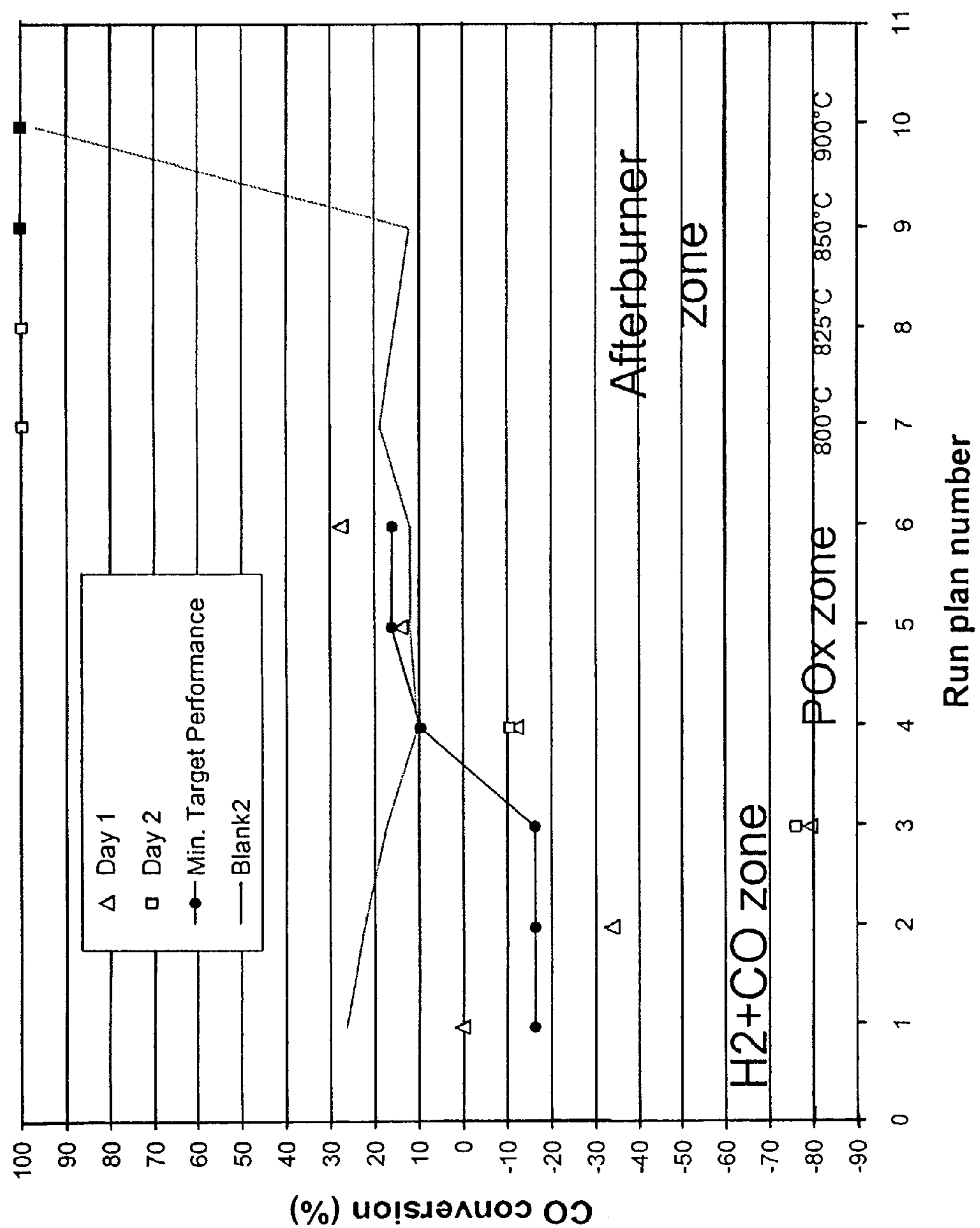
Figure 11:
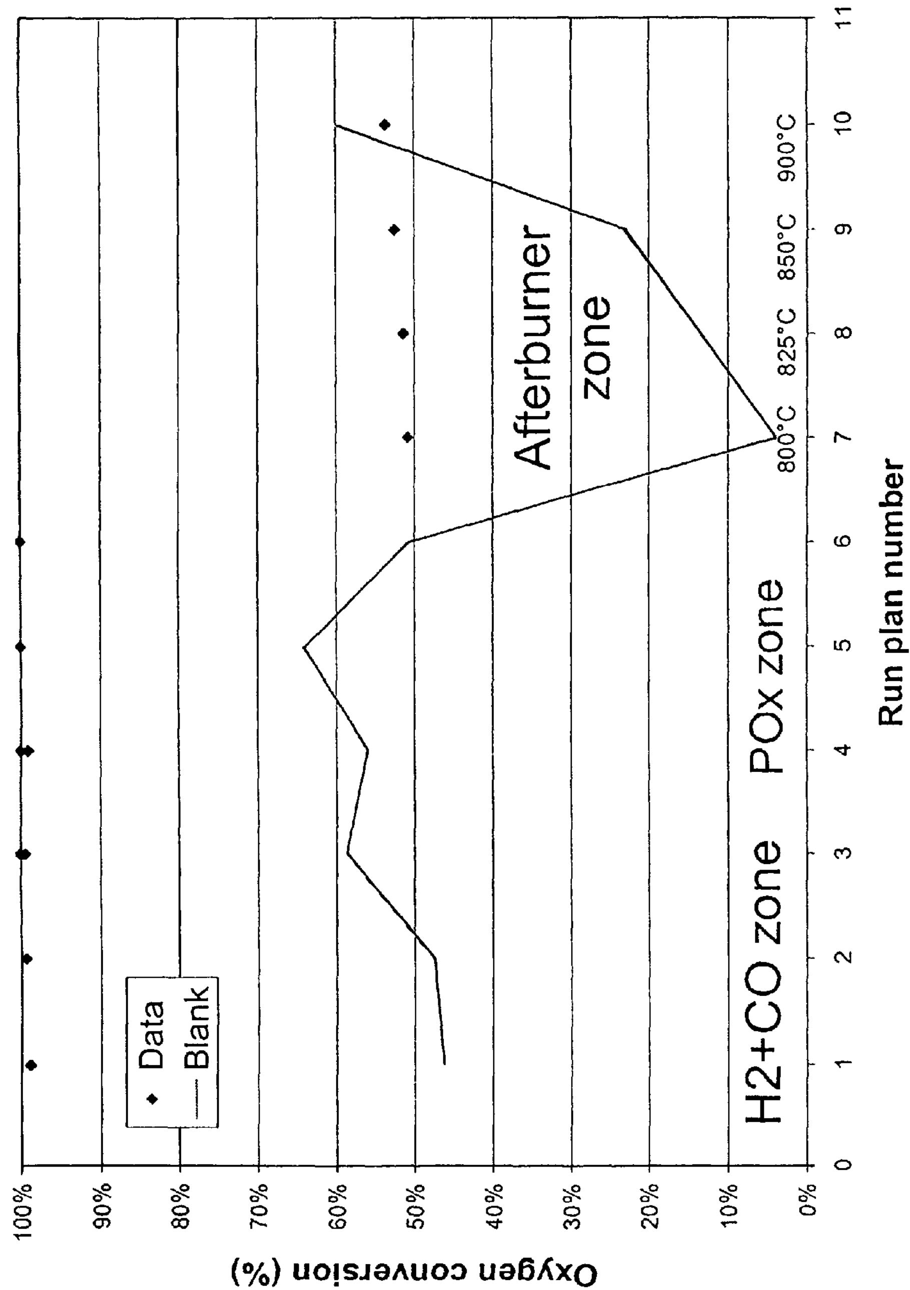
Figure 11:
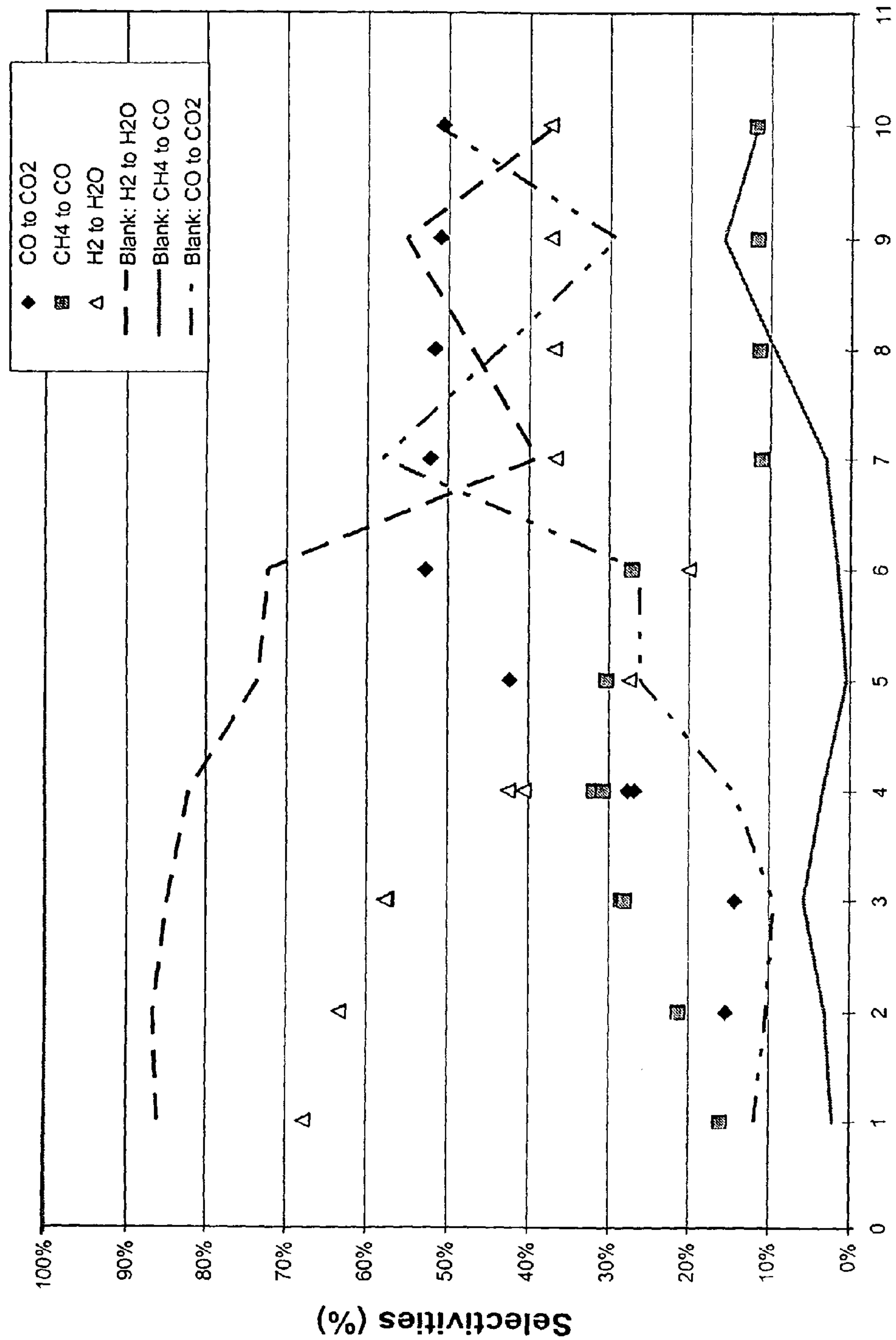

As shown in FIG. 11, performance of the same catalyst except with an aluminized (and oxidized) layer on a FeCrAlY substrate was about the same.

Figure 12:
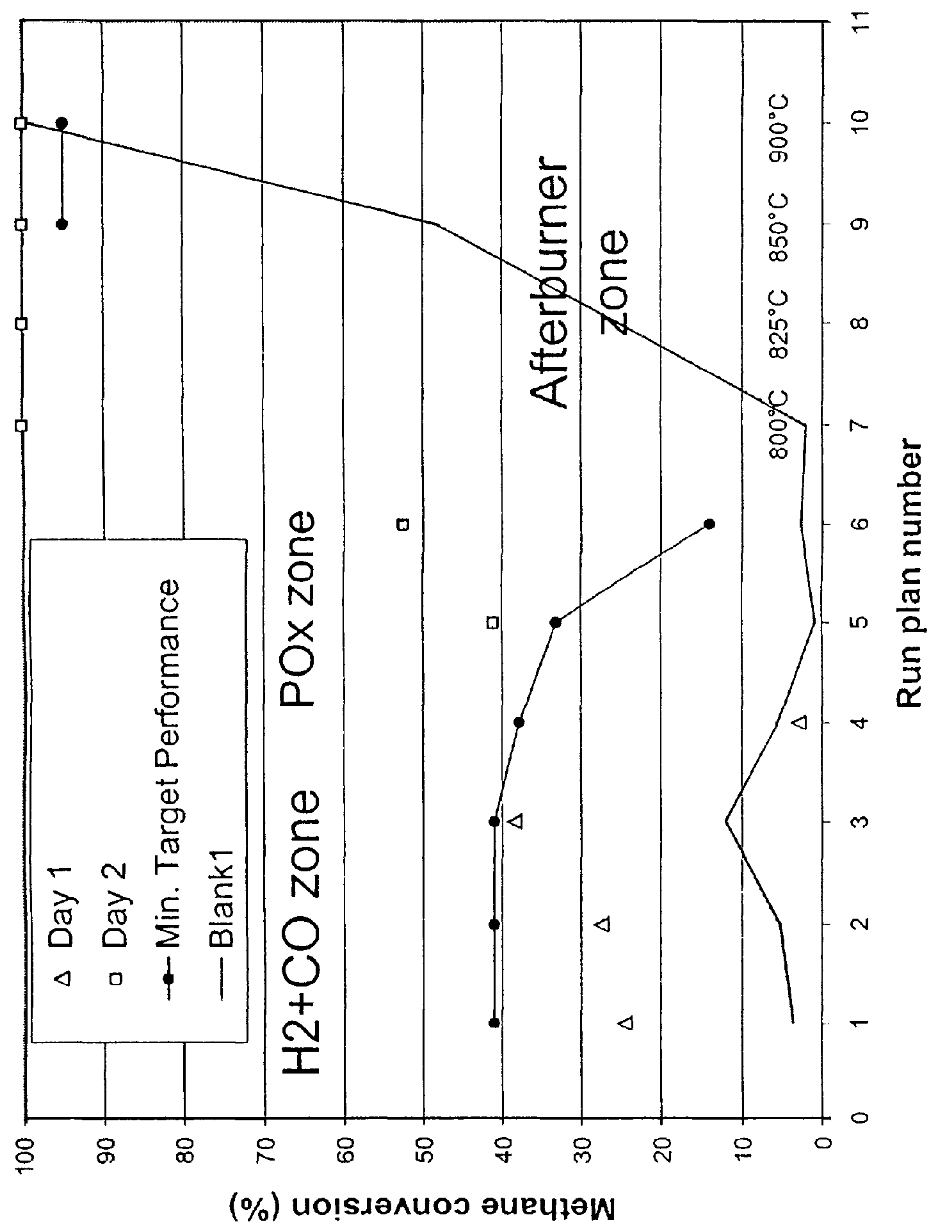
FIG. 12 shows performance of 8% Re-30% Pt on La-stabilized (sol-derived) alumina on FeCrAlY in a microchannel test apparatus: (a) methane conversion; (b) CO conversion; (c) $O_2$ conversion; and (d) $O_2$ selectivity.
Figure 12:
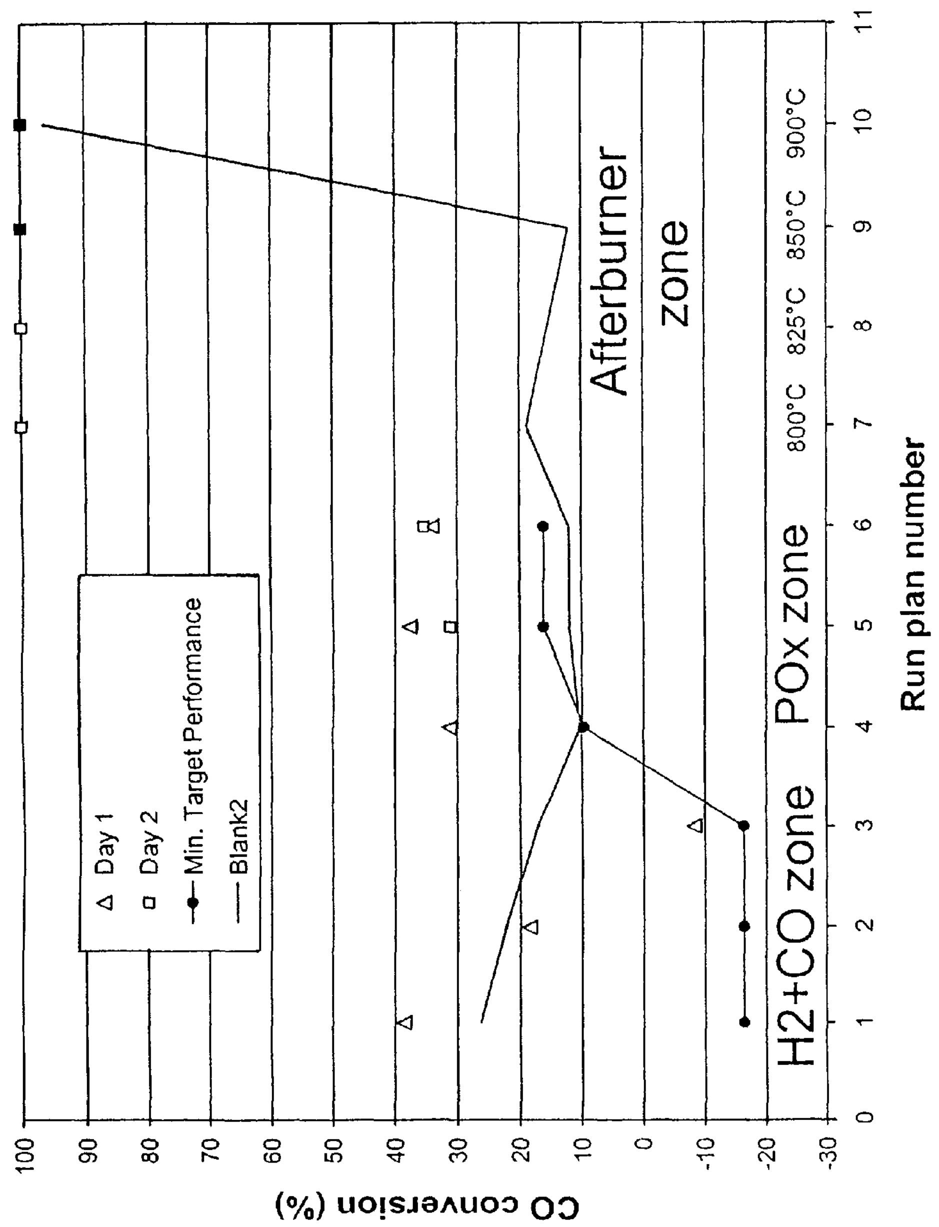
Figure 12:
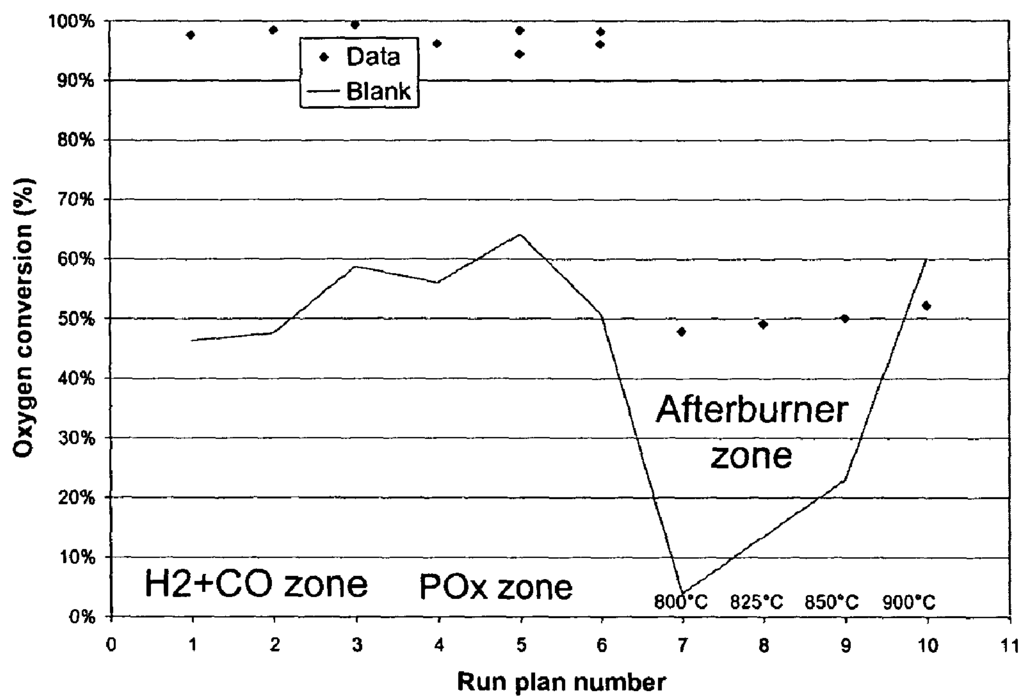
Figure 12:
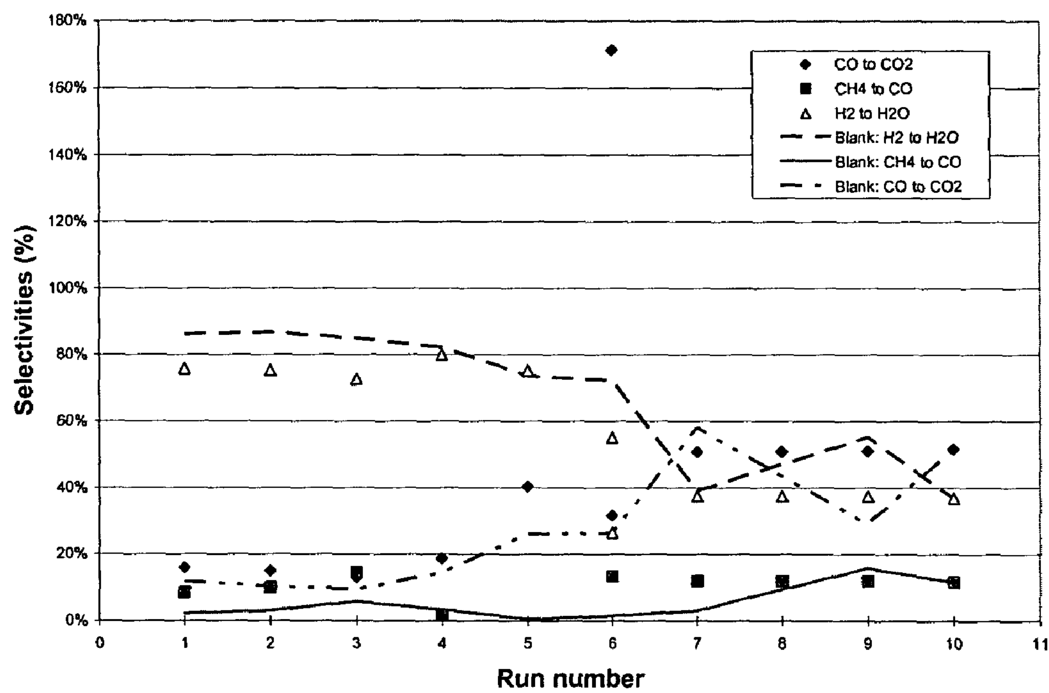
Figure 13:
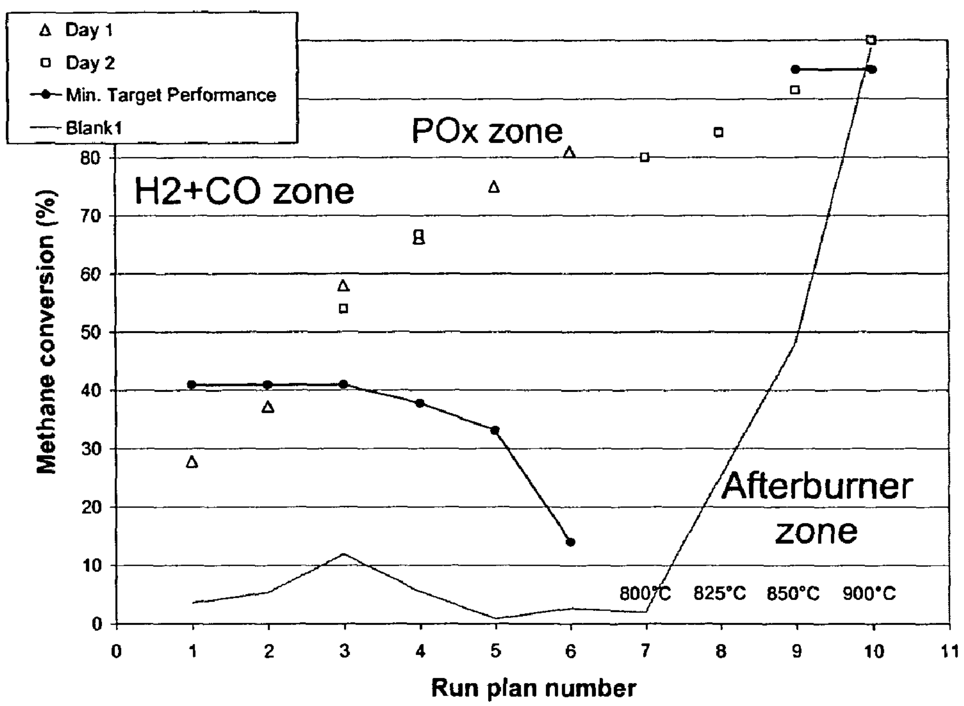
FIG. 13 shows performance of 8% Re-30% Pt on La-stabilized fumed alumina (81 $m^2/g$) on FeCrAlY in a microchannel test apparatus: (a) methane conversion; (b) CO conversion; (c) $O_2$ conversion; and (d) $O_2$ selectivity.
Figure 13:
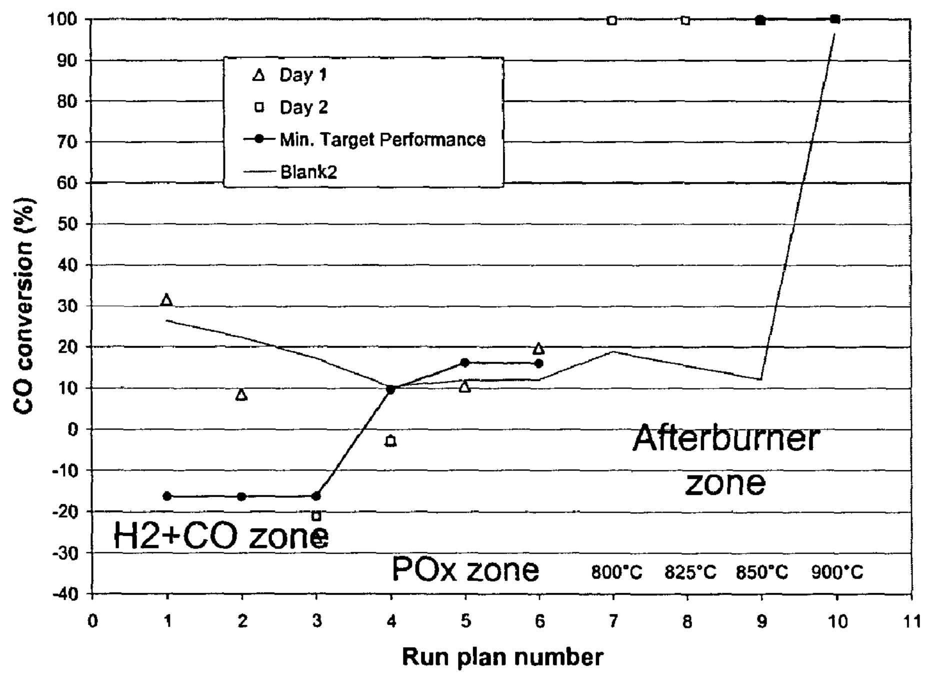
Figure 13:
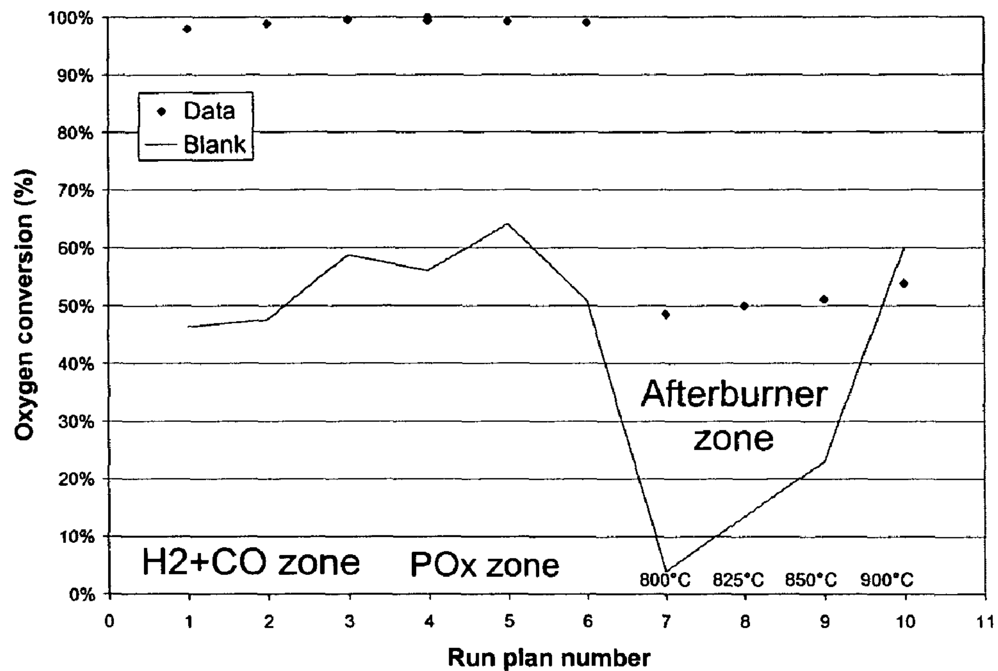
Figure 13:
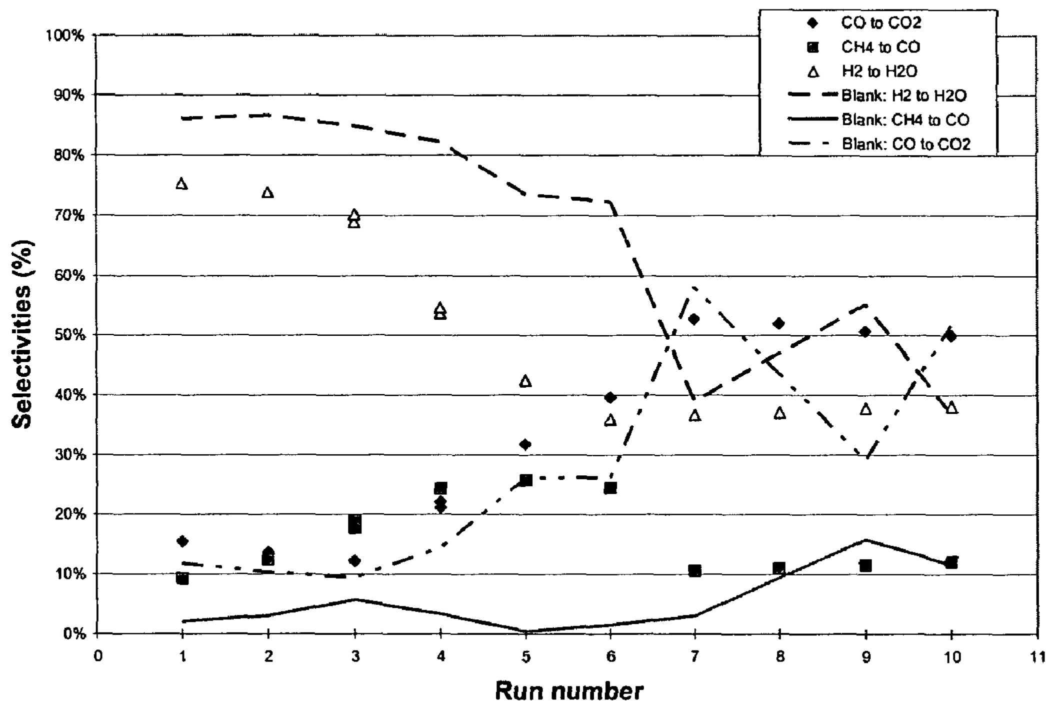

Activity measurement was made on the 8% Re-30% Pt catalysts supported on La-alumina derived from sol and La-alumina fumed (81 AA) as shown in FIGS. 12(*a-d*) and FIGS. 13(*a-d*), respectively. When Re is present, methane conversion in H2/CO and Pox zones was lower than that without Re. However, over La—$Al_2O_3$ (sol) supported Re—Pt, methane conversion was 100% even at 800° C. Between the two supports (La stabilized alumina sol or fumed alumina), activity in $H_2$/CO and POX zones was improved over the fumed alumina.

To study the support effect, 8% Re-30% Pt was prepared on Zr—La—$Al_2O_3$ (fumed alumina 51) on FeCrAlY. The methane conversion profile over all zones was very similar to that over 8% Re-30% Pt/La—$Al_2O_3$ (fumed alumina 81AA). However, CO conversion in the afterburner zone did not reach 100% and oxygen conversion in that zone also showed low overall conversion. POX activity on this catalyst was not as great as some other Pt-only catalyst.

Figure 14:
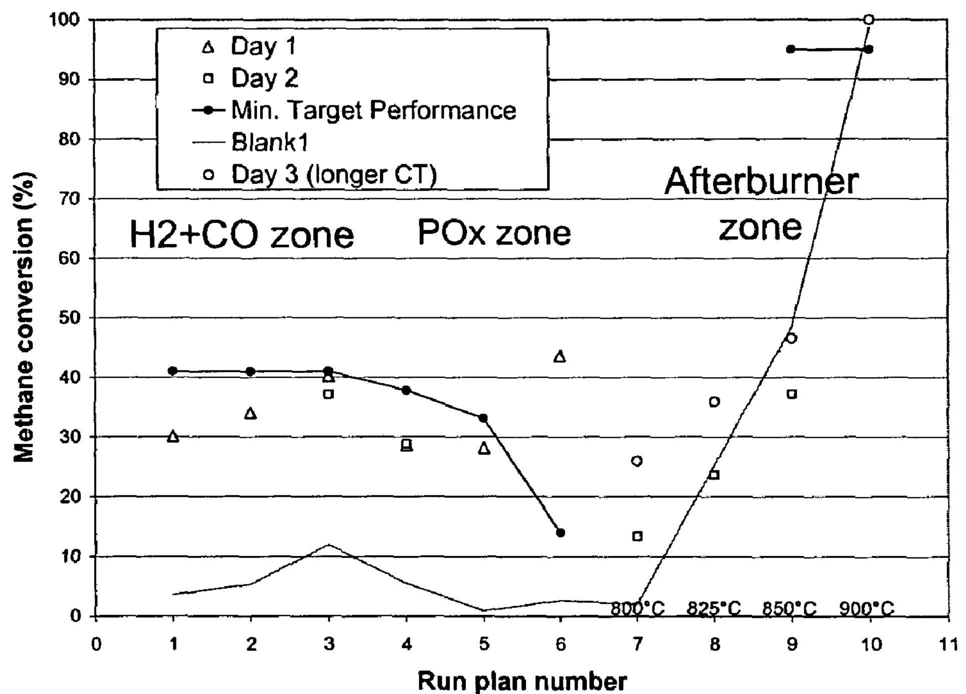
FIG. 14 shows performance of a catalyst in which Pt was directly applied to FeCrAlY: (a) methane conversion; (b) CO conversion; (c) $O_2$ conversion; and (d) $O_2$ selectivity. In this example, the FeCrAlY was initially coated with an aluminum layer (by CVD) and an oxide layer grown from the aluminized layer prior to depositing Pt.
Figure 14:
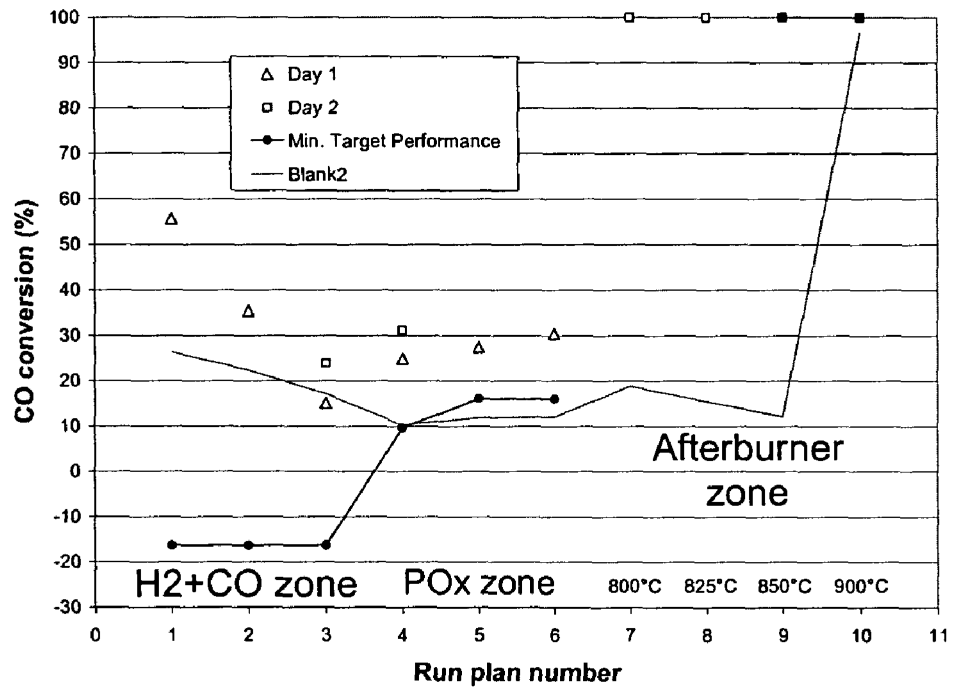
Figure 14:
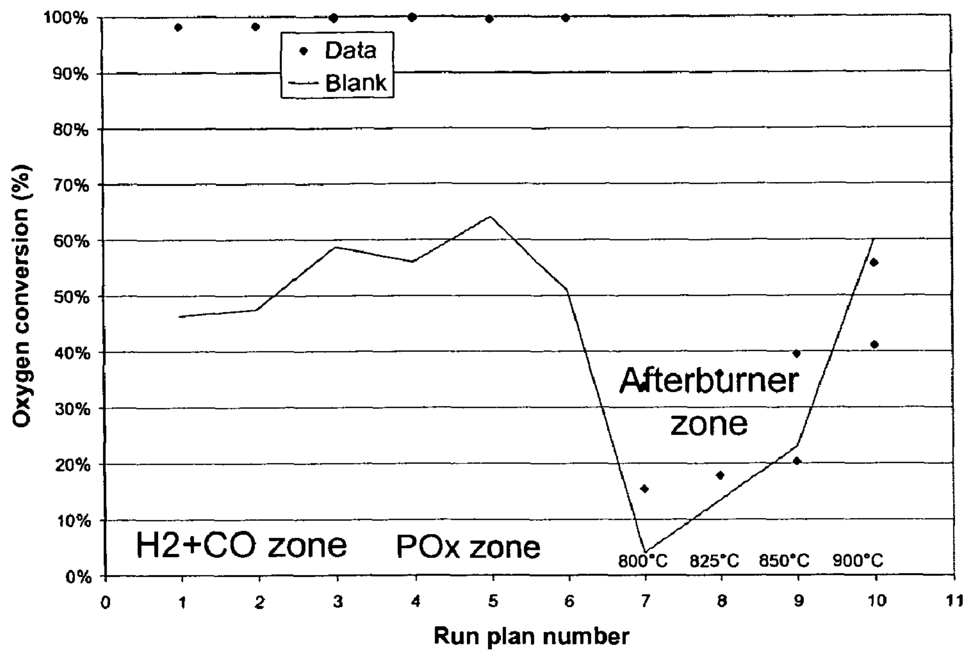
Figure 14:
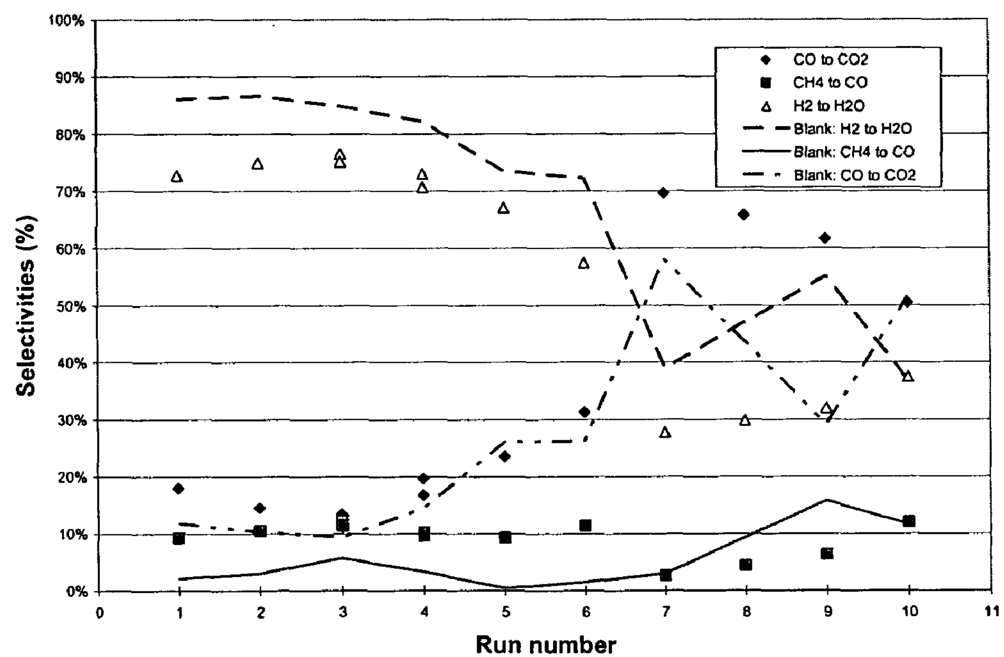
Figure 15:
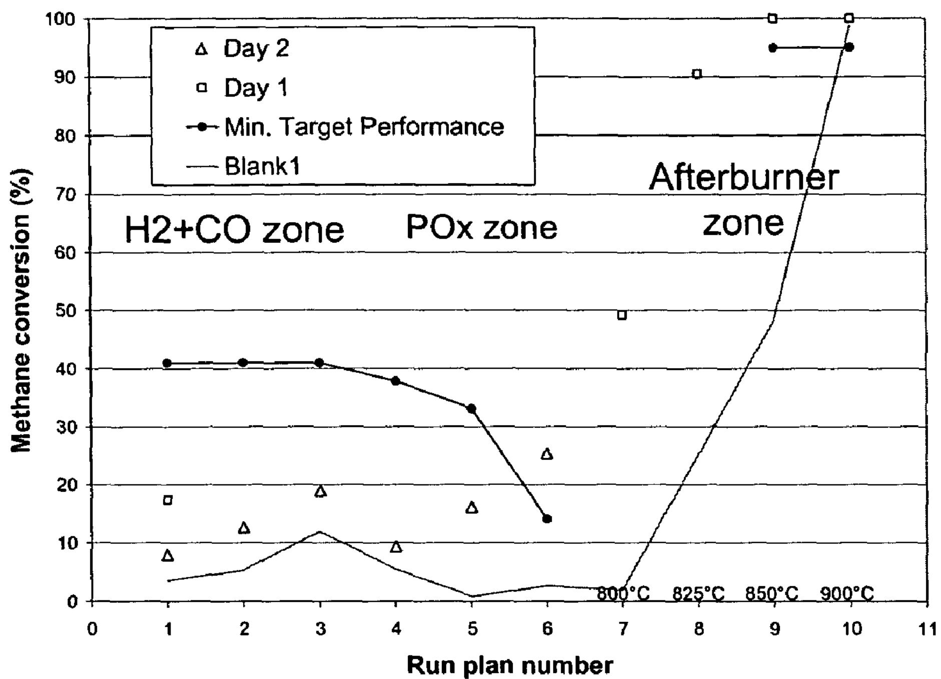
FIG. 15 shows performance of Re—Pt directly applied to FeCrAlY: (a) methane conversion; (b) CO conversion; (c) $O_2$ conversion; and (d) $O_2$ selectivity. In this example, the FeCrAlY was initially coated with an aluminum layer (by CVD) and an oxide layer grown from the aluminized layer prior to depositing Pt.
Figure 15:
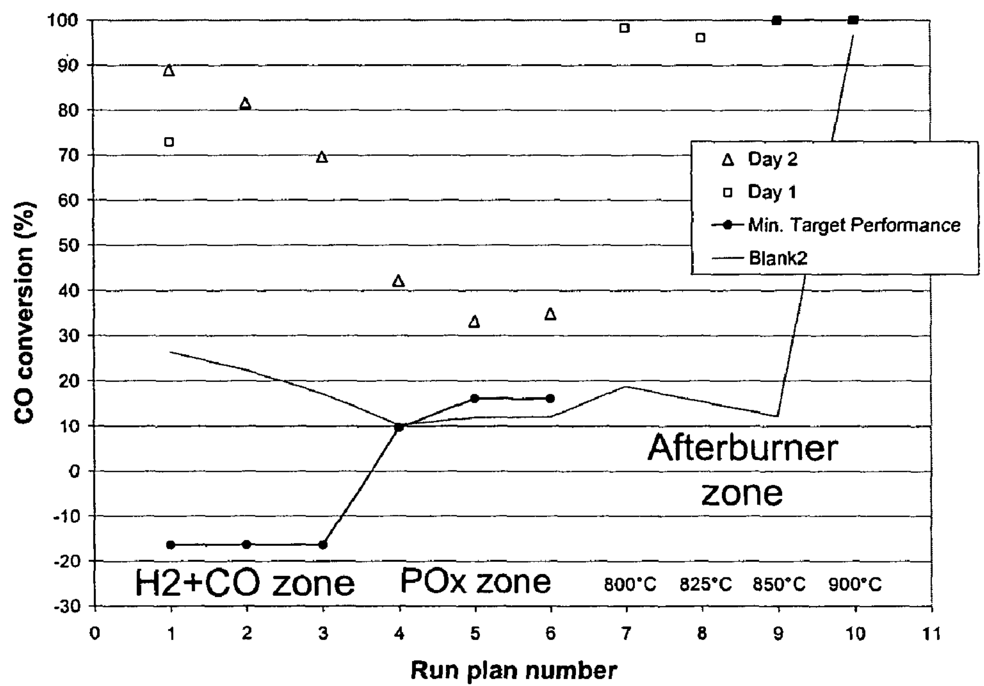
Figure 15:
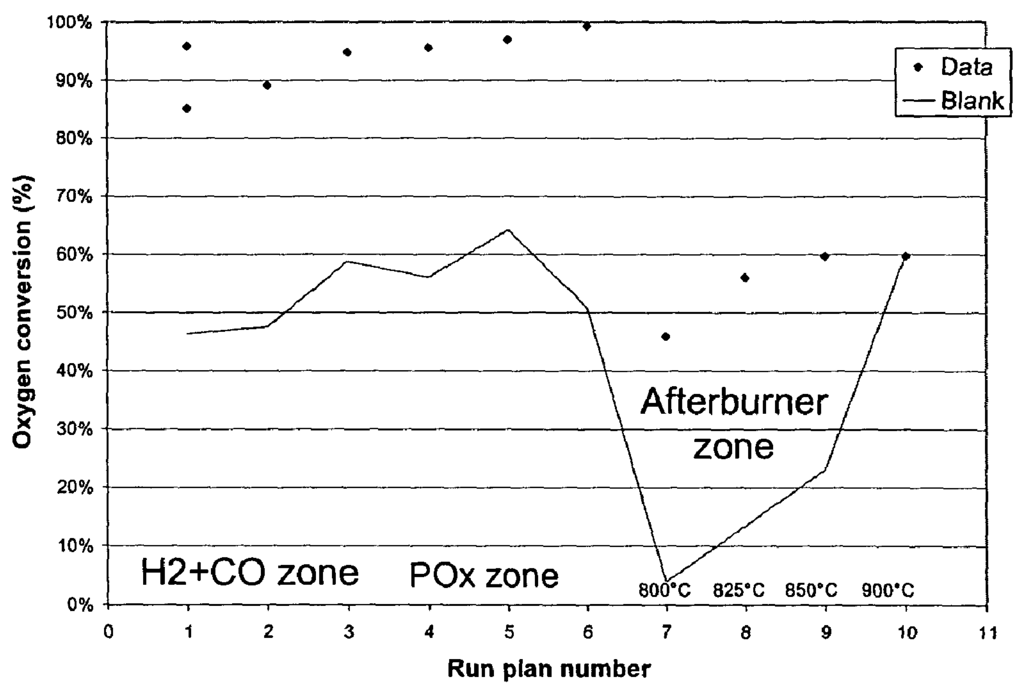
Figure 15:
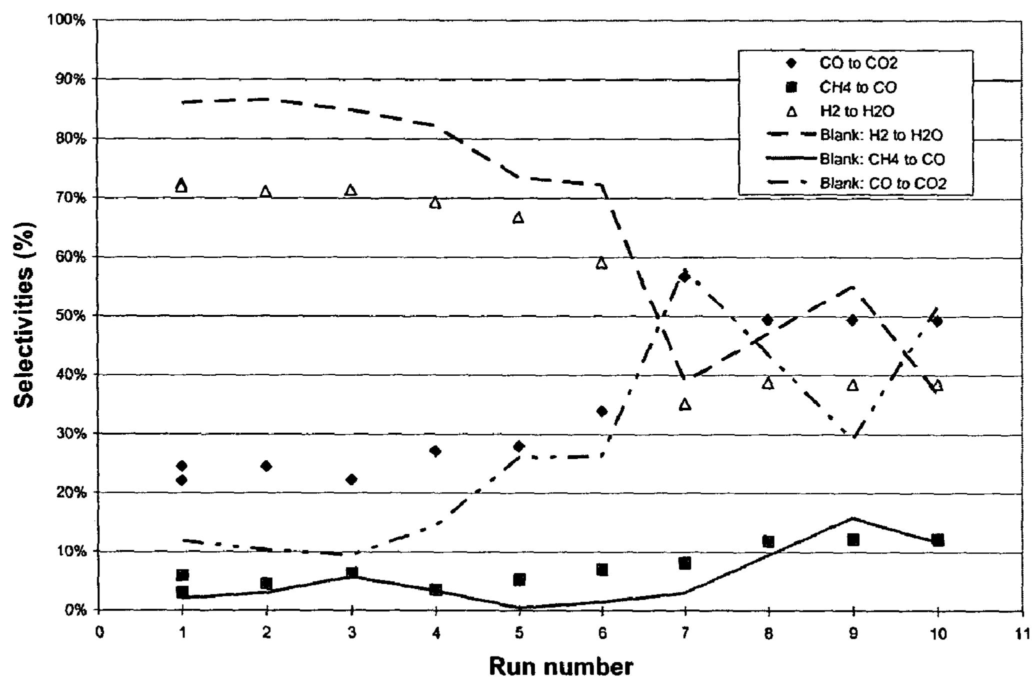

As an alternative to slurry coating, we tested directly applying Pt and Re—Pt onto coupons (aluminized alloy 617 with a thermally grown aluminum oxide layer) as shown in FIGS. 14(*a-d*) and FIGS. 15(*a-d*), respectively. Metal loading on these coupons were equivalent to the total metal loading for slurry (30% of 15 mg/$in^2$ 4.5 mg/$in^2$, for Pt). Methane conversion profile over the direct Pt coupon shows that the target performance in $H_2$/CO and POX zones were close to being met; however, in the afterburner zone the activity was similar to background (no catalyst). The reduction in activity in the afterburner zone may have been done to a reduction in Pt surface area under afterburner conditions. Testing with loading reduced to 1.5 mg/$in^2$ Pt showed a significant reduction in activity. Coating without a slurry is especially desirable in microchannels or in devices with small openings in which the microchannels or openings can be fully or partly occluded by the slurry particles.

Direct Coating Methodology:

On heat treated aluminized alloy 617 coupon, aqueous metal solution used as precursors were directly applied at room temperature. For the Pt system, 9% (atomic Pt) of tetraammineplatinum hydroxide solution was used. After each coating, the coupon was calcined at 450° C. for 1 hr in air. Once the desired weight gain was achieved, the coupon was calcined at 850° C. for 4 hrs in air for the final calcination. For Re—Pt system, perrhenic acid or ammonium perrhenate can be used and was coated first before Pt was applied. The same calcinations protocol was used.

Figure 16:
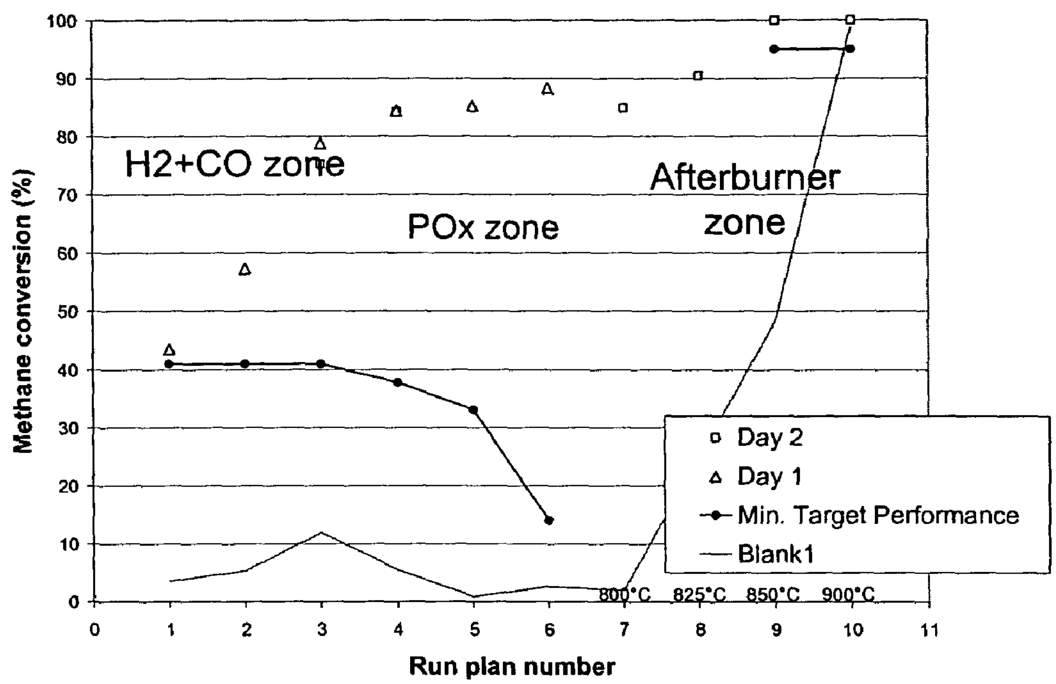
FIG. 16 shows performance of Pt on La-stabilized sol-derived alumina on FeCrAlY in a microchannel test apparatus: (a) methane conversion; (b) CO conversion; (c) $O_2$ conversion; and (d) $O_2$ selectivity. In this example, the FeCrAlY was initially coated with an aluminum layer (by CVD) and an oxide layer grown from the aluminized layer prior to depositing Pt.
Figure 16:
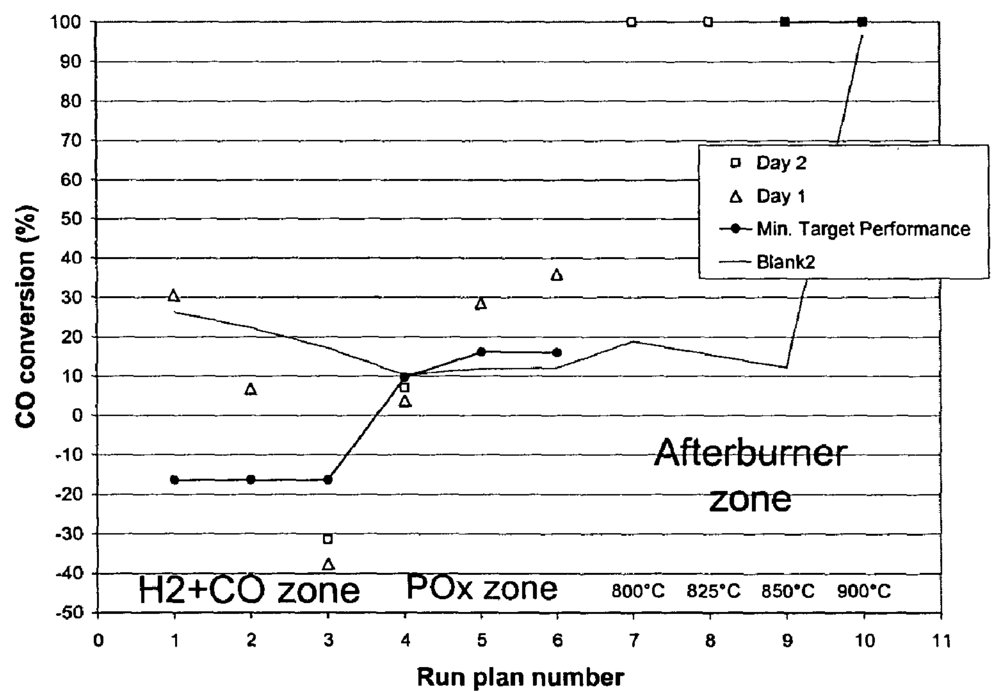
Figure 16:
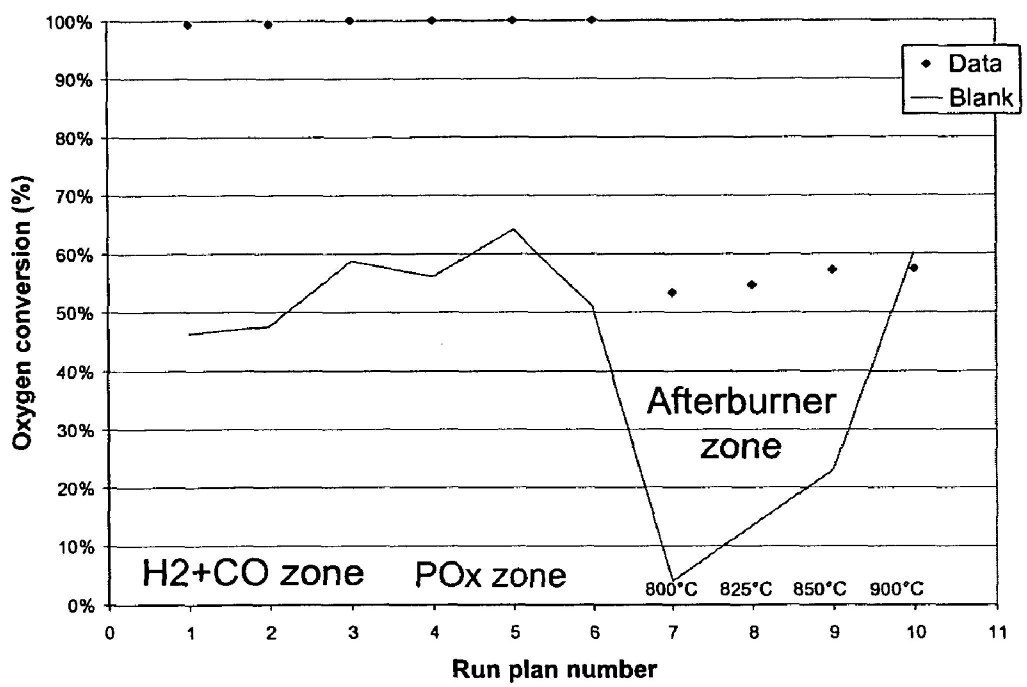
Figure 16:
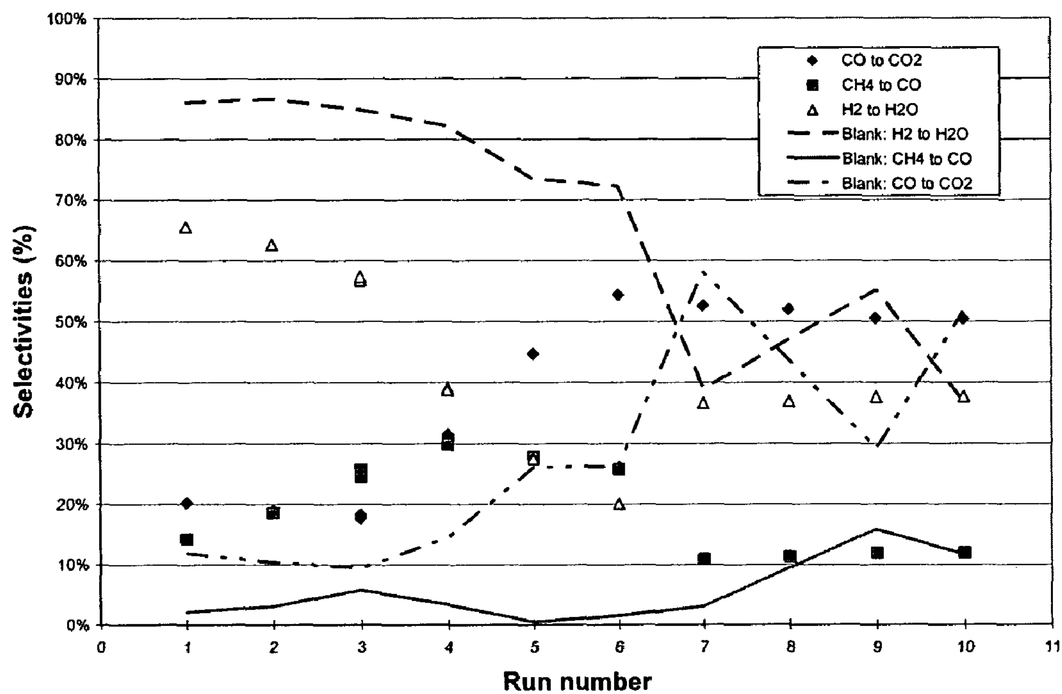
Figure 17:
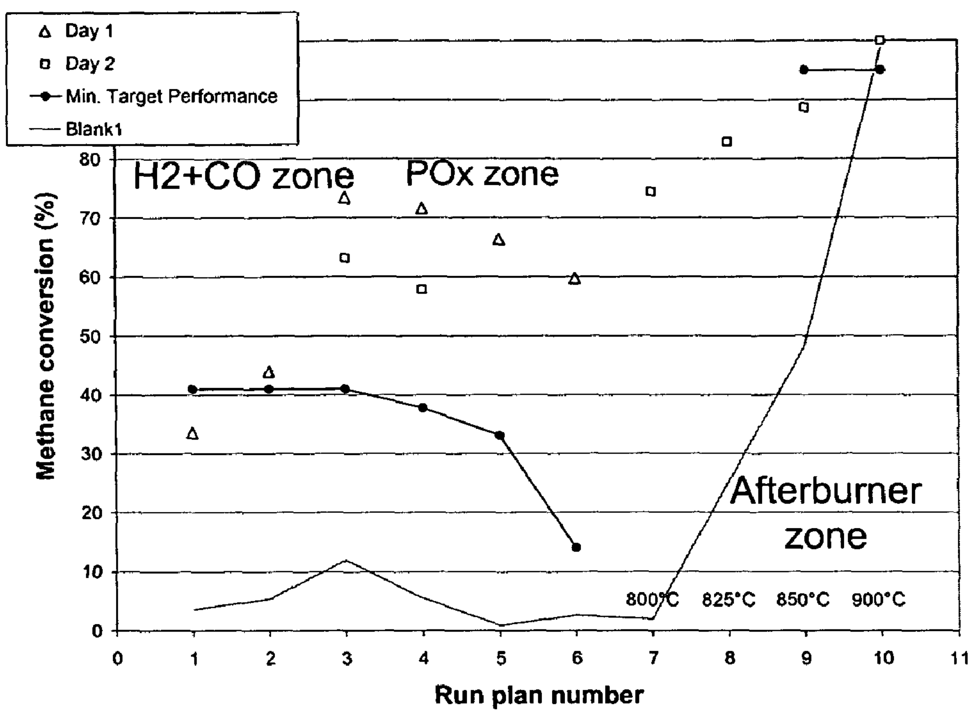
FIG. 17 shows performance of Pt—Re on La-stabilized sol-derived alumina on FeCrAlY in a microchannel test apparatus: (a) methane conversion; (b) CO conversion; (c) $O_2$ conversion; and (d) $O_2$ selectivity. In this example, the FeCrAlY was initially coated with an aluminum layer (by CVD) and an oxide layer grown from the aluminized layer prior to depositing Pt.
Figure 17:
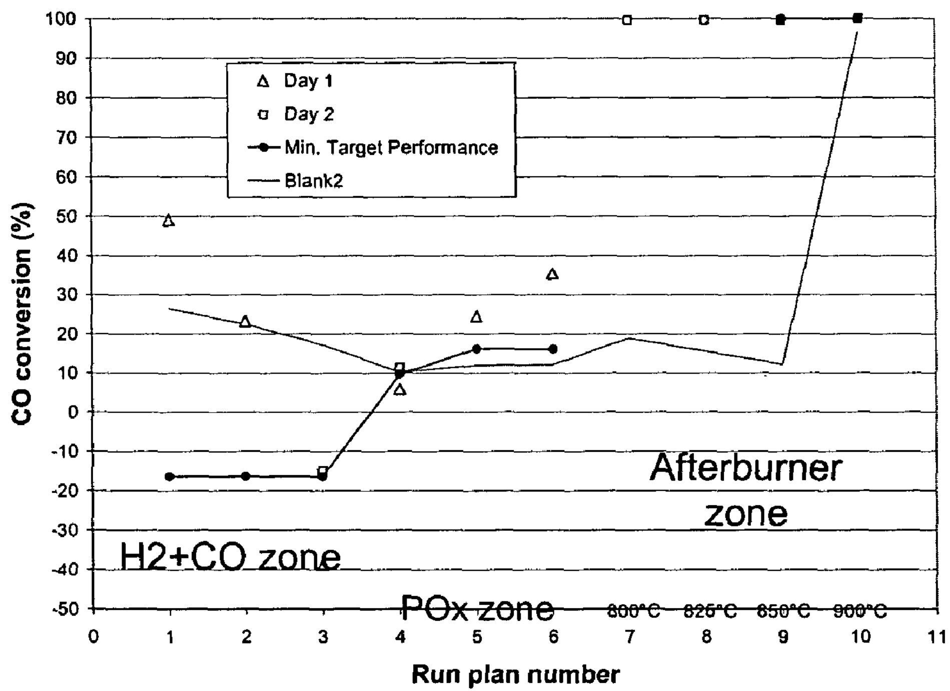
Figure 17:
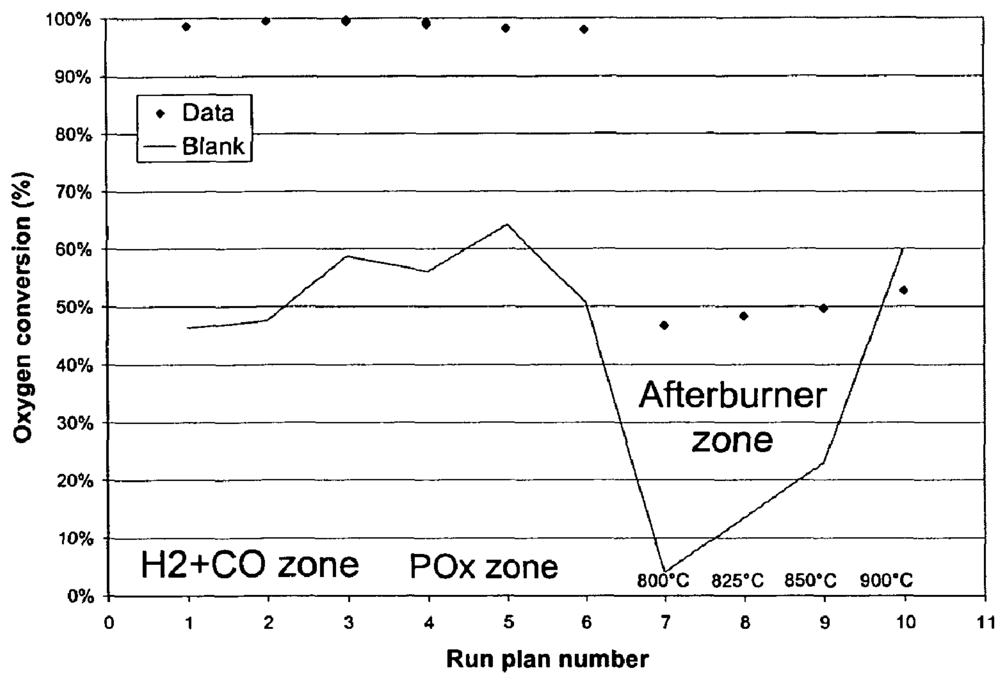
Figure 17:
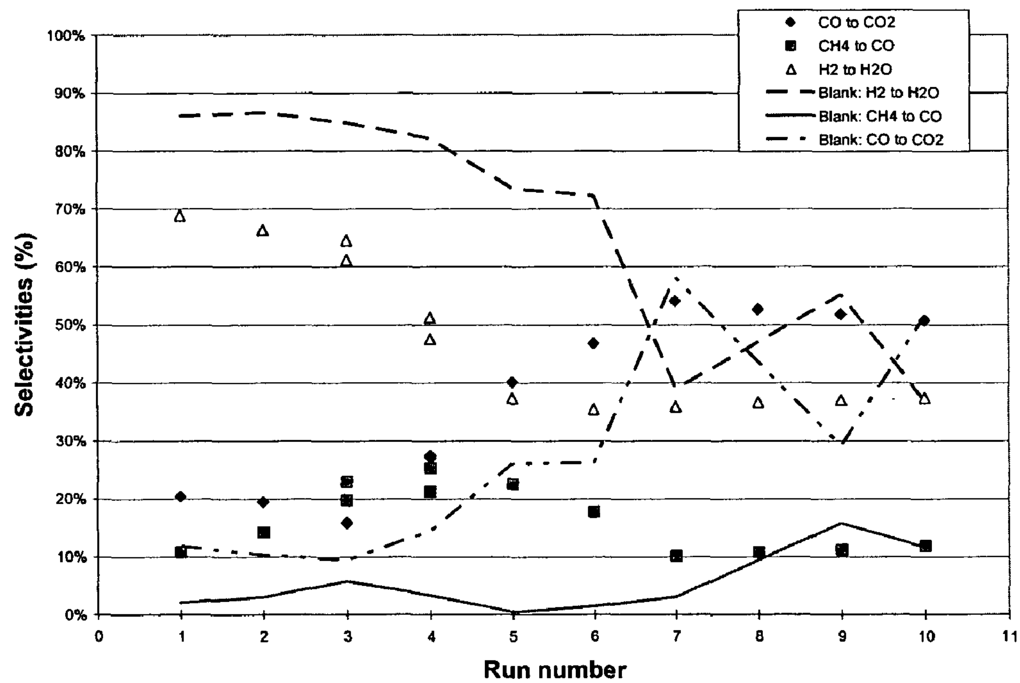

Sequential Coating Methodology:

A sequential coating method (building catalyst in-situ) has also been studied. La-PVA was coated on an aluminized coupon (the coupon was aluminized by CVD and thermally oxidized), then 7 layers of 20% alumina sol, 1 layer of 10% La nitrate, and 3 layers of 10% solution of tetraammineplatinum nitrate were sequentially coated on the coupon. FIGS. 16(*a-d*) present the results on this catalyst. In $H_2$/CO and POX zones, this catalyst exceeded the target values significantly with great reproducibility data on the second day. In the afterburner zone, activity was comparable to that over slurry coated catalyst. For the lifetime of catalyst, an aluminized device which was coated in-situ with similar methodology was tested to be on stream for over 460 hours with 100% methane conversion. FIGS. 17(*a-d*) present the results on a sequentially built catalyst with the presence of Re on the same substrate. Though methane conversion in $H_2$/CO and POx zones was not as great as that over Pt-only, it was still greater than that over the Re—Pt catalyst on La-alumina (slurry coat).

Indirect Coating Method (intervening sol-coated alumina layers)—The surface of alloy 617 coupon was aluminized by CVD, then oxidized at 1050° C. for 10 hrs to form a layer of alumina; an aqueous solution of 10 wt % $La(NO_3)_3 6H_2O$ and 1 wt % polyvinylalcohol (PVA) was applied to stabilize the alumina and calcined at 1000° C. for 4 hrs in air at 3.5° C./min; then a 20% alumina sol was applied over this and calcined at 1000° C. for 4 hrs in air at 3.5° C./min; then it was impregnated with 10 wt % $La(NO_3)_3 6H_2O$ aqueous solution and calcined at 1000° C. for 4 hrs in air at 3.5° C./min; followed by addition of Pt. The inter calcination for Pt coating was carried out at 450° C. for 1 hr and the final calcinations at 850° C. for 4 hrs.

Figure 18:
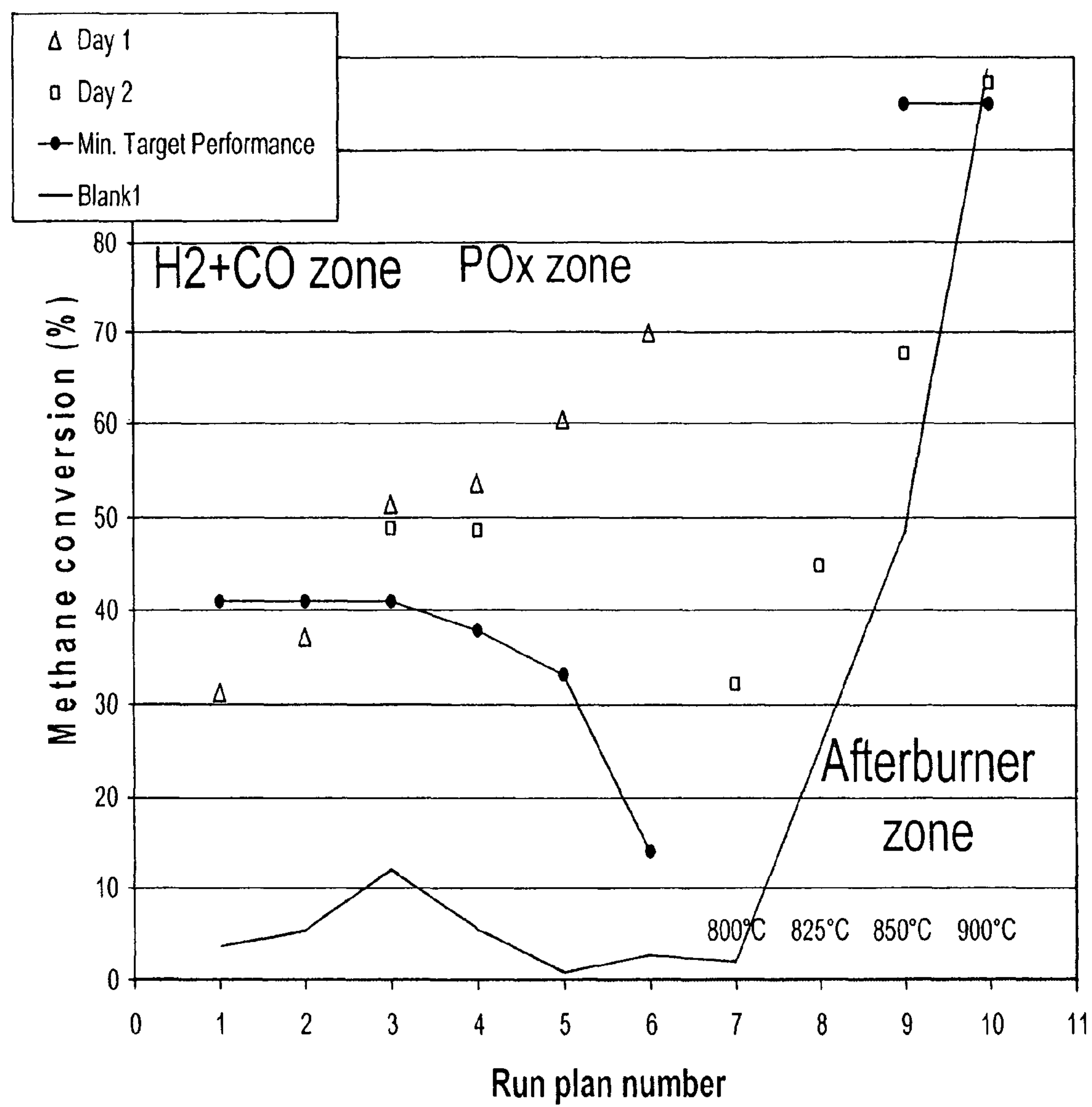
FIG. 18 shows CH4 conversion for a catalyst prepared as follows: 1 coat La-PVA, 1 coat 20% sol (0.9 $mg/in^2$), 1 coat La nitrate, 4 coats $(NH_3)_4Pt(OH)_2$ (4.0 $mg/in^2$); final calcination 850° C. 4 hrs.
Figure 19:
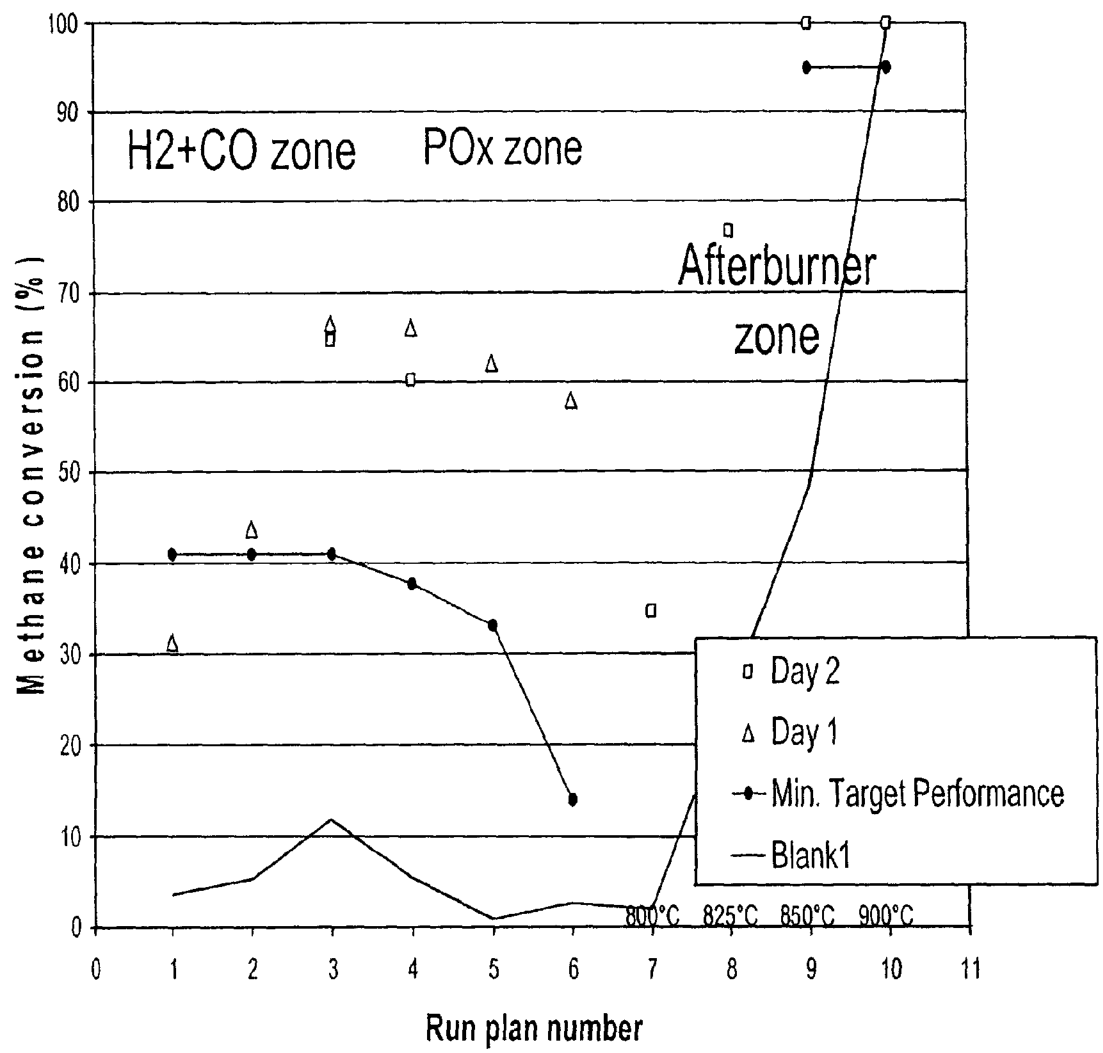
FIG. 19 shows CH4 conversion for a catalyst prepared as follows: 1 coat La-PVA, 3 coats 20% sol (2.8 $mg/in^2$), 1 coat La nitrate, 7 coats $(NH_3)_4Pt(OH)_2$ (4.5 $mg/in^2$) final calcination 850° C. 4 hrs.

Experimental testing showed that at least up to 3 mg/$in^2$ alumina sol can be strongly adhered on the aluminized surface for 1000 hrs under a simulated combustion exhaust environment. We prepared Pt coated catalysts on La-stabilized alumina (<3 mg/$in^2$). The effect of alumina sol loading on activity is shown in FIGS. 18 and 19. While Pt loading was kept at a similar level, alumina sol loading was varied by 3 times (1 sol coat vs. 3 sol coats; 0.9 vs. 2.8 mg/$in^2$, respectively). Having a higher alumina loading resulted in slight activity improvement in run plans 3-4 and significant improvement in the afterburner zone, reaching 100% methane conversion at 850° C.

Figure 20:
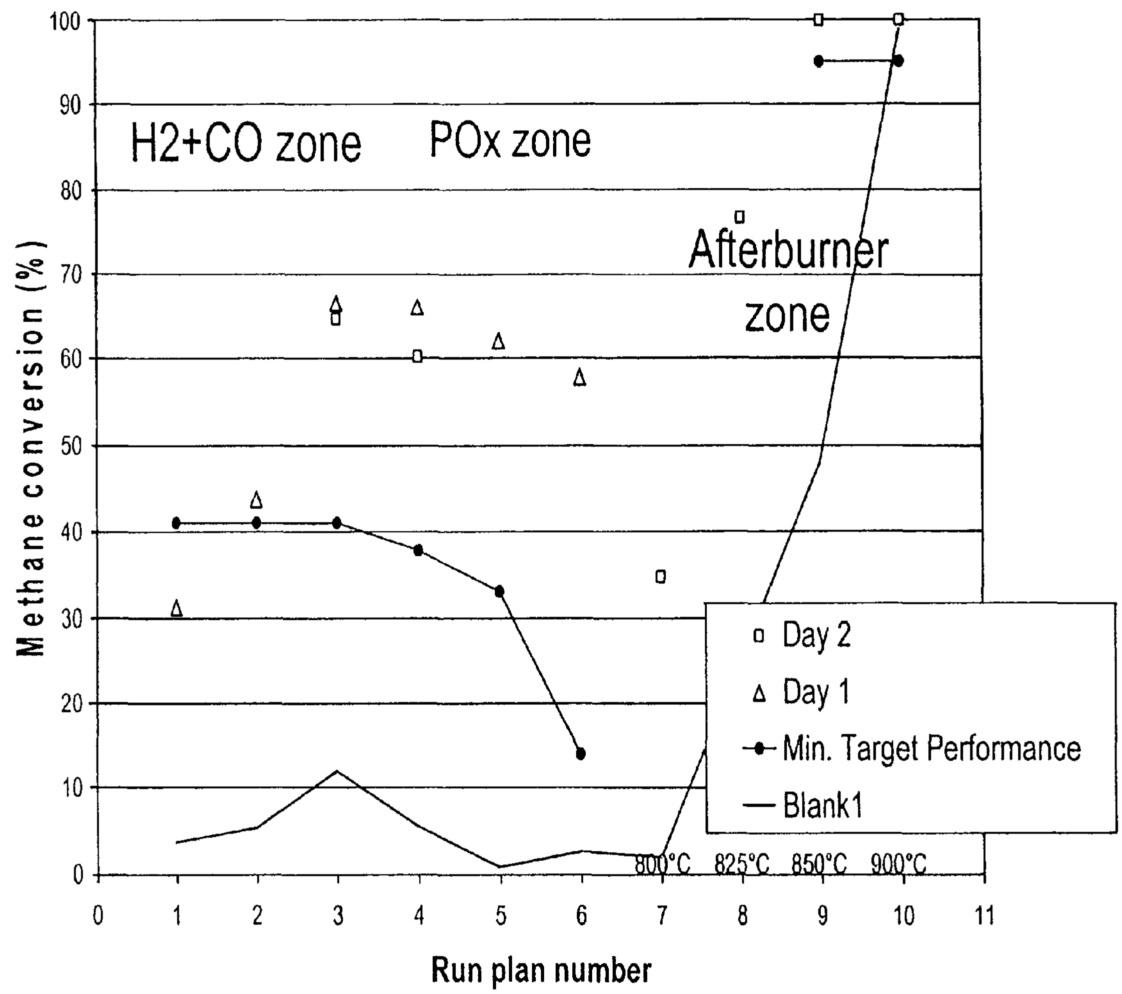
FIG. 20 shows CH4 conversion for a catalyst prepared as follows: 1 coat La-PVA, 3 coats 20% sol (2.8 $mg/in^2$), 1 coat La nitrate, 7 coats $(NH_3)_4Pt(OH)_2$ (4.5 $mg/in^2$) final calcination 850° C. 4 hrs.
Figure 21:
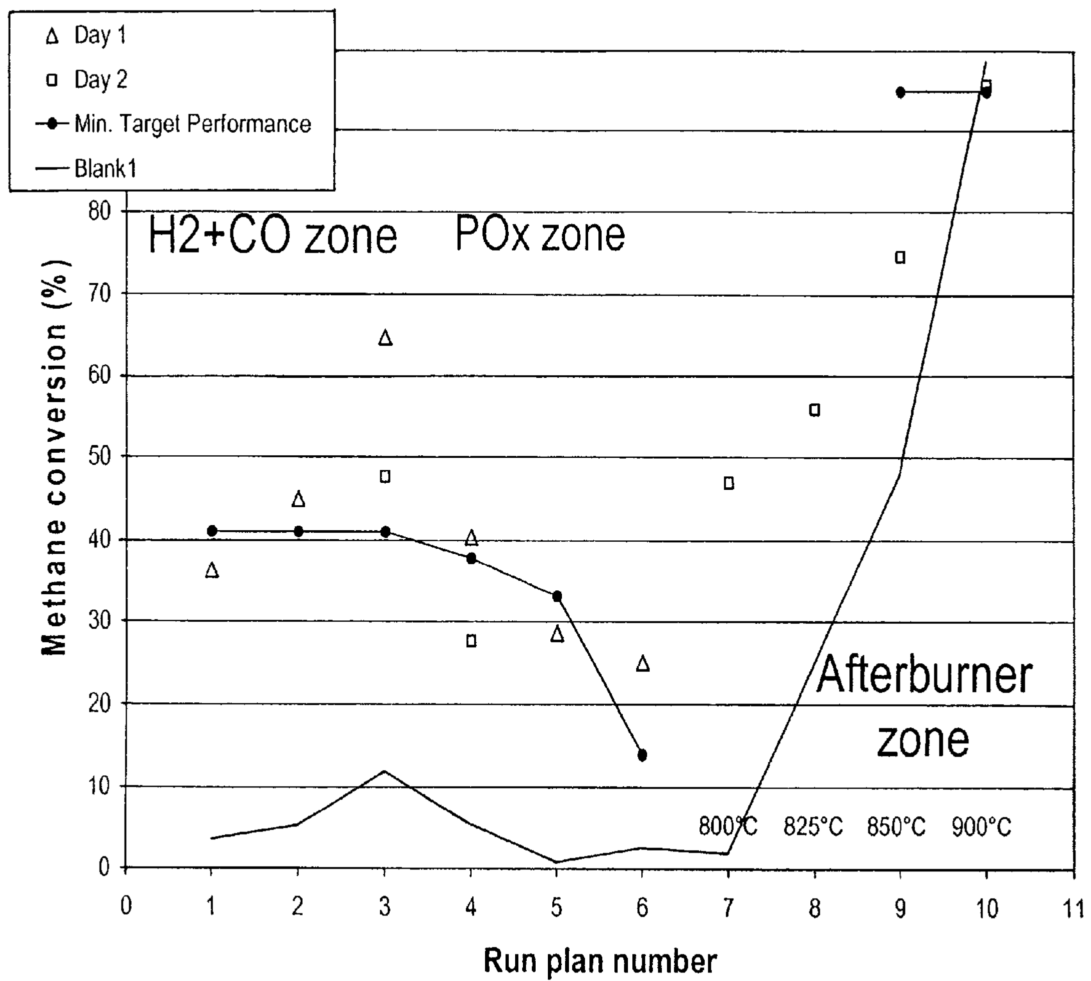
FIG. 21 shows CH4 conversion for a catalyst prepared as follows: 1 coat La-PVA, 3 coats 20% sol (2.8 $mg/in^2$), 1 coat La nitrate, 3 coats $(NH_3)_4Pt(OH)_2$ (2.5 $mg/in^2$) final calcination 850° C. 4 hrs.

The effect of Pt loading was studied on 3 coats of sol at two Pt loading levels, 4.5 and 2.5 mg/$in^2$ as shown in FIGS. 20 and 21, respectively. Methane conversion on the low-loading-Pt catalyst was much lower in all zones compared to the high-loading-Pt catalyst.

We claim:

1. An integrated combustion microreactor, comprising:

a combustion chamber comprising a microchannel comprising a combustion catalyst;

wherein the combustion catalyst comprises a support and catalyst metal;

wherein the support comprises alumina and wherein the catalyst metal comprises Pt;

wherein the combustion catalyst comprises at least 30 weight percent Pt;

an endothermic reaction chamber that is adjacent the combustion chamber;

wherein the endothermic reaction chamber comprises an endothermic reaction catalyst; and a thermally conductive wall separating the combustion chamber and the endothermic reaction chamber.

2. The microreactor of claim 1 wherein the combustion catalyst support is a wall coating.

3. The microreactor of claim 1 wherein the combustion catalyst comprises 30 to 90 weight percent Pt, and the support consists essentially of stabilized alumina.

4. The microreactor of claim 1 wherein the microchannel comprises a first zone and a second zone;

wherein the first zone comprises a combustion catalyst that consists essentially of stabilized alumina and at least 30 wt % Pt; and wherein the second zone comprises a combustion catalyst that comprises Pt and Re; and wherein the combustion catalyst in the second zone comprises at least 30 wt % Pt.

5. The microreactor of claim 1 comprising at least one flat surface having a combustion catalyst coating with a Pt loading of at least 3.0 mg per square inch.

6. The microreactor of claim 1 wherein the combustion chamber comprises a microchannel wall and the microchannel wall comprises at least one orifice so that, during operation, fuel and oxygen can be mixed in the combustion chamber.

7. The microreactor of claim 1 comprising at least 3 substantially planar layers of combustion channels alternating with at least 3 substantially planar layers of endothermic reaction channels, comprising the order of layers: combustion: reaction: combustion: reaction: combustion: reaction.

8. The microreactor of claim 1 characterizable by an activity such that, when exposed to the conditions of run plan 2 adjusted to a hydrocarbon contact time of 35 ms, there is an oxygen conversion of at least 80%, and an oxygen selectivity to water that is less than 80%.

9. The microreactor of claim 8 characterizable by an activity such that, when exposed to the conditions of run plan 2 adjusted to a hydrocarbon contact time of 35 ms, there is a methane conversion above 40%, and an oxygen selectivity of methane to CO that is about the same as or more than the oxygen selectivity of CO to $CO_2$.

10. The microreactor of claim 1 wherein the combustion catalyst is applied by solution coating, or sol coating, and is not applied from a slurry.

11. The microreactor of claim 1 characterizable by a stability such that when the microreactor is exposed to a gas composition of 2% $CH_4$, 4.4% $O_2$, 10% $H_2O$, at 0.68 msec contact time and 900° C. for 100 hours continuous time on stream, the microreactor maintains its reactivity such that, at these conditions, the microreactor is able to convert at least about 80% of the methane.

12. An integrated combustion reactor (ICR) comprising:

a continuous combustion channel having at least a first zone comprising a combustion catalyst that comprises Pt and essentially no Re and a second zone comprising a combustion catalyst that comprises Pt—Re; and a thermally conductive wall which separates the continuous combustion channel from an adjacent endothermic reaction chamber.

13. The ICR of claim 12 wherein the continuous combustion channel having at least two zones comprises a microchannel that extends over both zones; wherein the microchannel has a height or width of 5 mm or less.

14. The ICR of claim 12 wherein the combustion catalyst in the first zone comprises at least 30 wt % Pt.

15. The ICR of claim 14 wherein the combustion catalyst in the second zone comprises at least 30 wt % Pt.

16. The ICR of claim 15 wherein the combustion catalyst in the first zone comprises a stabilized alumina support.

17. The ICR of claim 16 wherein the combustion catalyst in the first zone and the combustion catalyst in the second are disposed in a wall coating on the wall that separates the continuous combustion channel and the endothermic reaction chamber.

18. A system for combusting a hydrocarbon, comprising:

an integrated combustion reactor (ICR) with a continuous combustion channel having at least two zones:

a first zone comprising a combustion catalyst that comprises Pt and essentially no Re; and a second zone comprising a combustion catalyst that comprises Pt—Re, further comprising:

dihydrogen, carbon monoxide, dioxygen, and hydrocarbon in the first zone; and carbon monoxide, dioxygen and hydrocarbon in the second zone;

wherein the ratio of dioxygen to hydrocarbon in the first zone is lower than in the second zone;

the system further comprising a thermally conductive wall which separates the continuous combustion channel from an adjacent endothermic reaction chamber.

19. The ICR of claim 13 characterizable by an activity such that, when exposed to the conditions of run plan 2 adjusted to a hydrocarbon contact time of 35 ms, there is an oxygen conversion of at least 80%, and an oxygen selectivity to water that is less than 80%.

20. The microreactor of claim 3 wherein the stabilized alumina comprises 1 to 10 weight percent La.

21. The microreactor of claim 1 wherein the catalyst contains at least 50 weight percent Pt.

22. The microreactor of claim 1 comprising at least one flat surface having a combustion catalyst coating with a Pt loading of at least 6 mg per square inch.

23. The microreactor of claim 2 wherein the microchannel comprising a combustion catalyst comprises fins and the support and catalyst metal is coated over the fins.

24. The ICR of claim 12 comprising multiple combustion layers interleaved with multiple layers of reaction microchannels.

25. The ICR of claim 12 wherein the continuous combustion channel is separated from an adjacent process channel by a wall having a thickness of 5 mm or less.

* * * * *